United States Patent
Kim et al.

(10) Patent No.: US 10,972,939 B2
(45) Date of Patent: *Apr. 6, 2021

(54) METHOD AND APPARATUS FOR RECEIVING MAC PDU IN MOBILE COMMUNICATION SYSTEM

(71) Applicant: Samsung Electronics Co., Ltd., Suwon-si (KR)

(72) Inventors: Soenghun Kim, Suwon-si (KR); Sangbum Kim, Suwon-si (KR); Kyeongin Jeong, Yongin-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,767

(22) Filed: Jul. 15, 2019

(65) Prior Publication Data

US 2019/0342793 A1 Nov. 7, 2019

Related U.S. Application Data

(63) Continuation of application No. 15/562,217, filed as application No. PCT/KR2016/003695 on Apr. 8, 2016, now Pat. No. 10,356,657.

(Continued)

(51) Int. Cl.
*H04W 4/00* (2018.01)
*H04W 28/06* (2009.01)
(Continued)

(52) U.S. Cl.
CPC .......... *H04W 28/06* (2013.01); *H04L 1/0045* (2013.01); *H04W 52/146* (2013.01);
(Continued)

(58) Field of Classification Search
None
See application file for complete search history.

(56) References Cited

U.S. PATENT DOCUMENTS

| 8,954,106 B2 | 2/2015 | Kim et al. |
| 2007/0153810 A1 | 7/2007 | Jang et al. |

(Continued)

FOREIGN PATENT DOCUMENTS

| CN | 101242397 A | 8/2008 |
| CN | 101785280 A | 7/2010 |

(Continued)

OTHER PUBLICATIONS

Nokia Networks et al., "MAC PDU containing reserved values", 3GPP TSG-RAN WG2 Meeting #89, R2-150509, Jan. 31, 2015, Athens, Greece.

(Continued)

*Primary Examiner* — Zewdu A Beyen
(74) *Attorney, Agent, or Firm* — Jefferson IP Law, LLP

(57) ABSTRACT

The present disclosure relates to a communication technique and system for converging, with IoT technology, a 5G communication system for supporting a higher data transmission rate beyond a 4G system. The present disclosure may be applied to intelligent services (for example, smart homes, smart buildings, smart cities, smart cars or connected cards, health care, digital education, retail business, security and safety related services, etc.), on the basis of the 5G communication technology and IoT associated technology. According to the present invention, in a method of receiving a MAC PDU, when an unused value is included in a received MAC PDU, the MAC PDU is received through a multicast channel, and the unused value is included in a sub-header of the MAC PDU, the sub-header and a payload portion (Continued)

corresponding to the sub-header are ignored and the remaining sub-header and payload portion are processed.

10 Claims, 18 Drawing Sheets

Related U.S. Application Data

(60) Provisional application No. 62/145,702, filed on Apr. 10, 2015.

(51) Int. Cl.
| | | |
|---|---|---|
| *H04W 74/08* | (2009.01) | |
| *H04L 1/00* | (2006.01) | |
| *H04W 52/14* | (2009.01) | |
| *H04W 52/36* | (2009.01) | |
| *H04W 52/38* | (2009.01) | |
| *H04W 74/00* | (2009.01) | |
| *H04W 80/02* | (2009.01) | |
| *H04L 29/06* | (2006.01) | |
| *H04L 29/08* | (2006.01) | |
| *H04W 84/04* | (2009.01) | |

(52) U.S. Cl.
CPC ....... *H04W 52/367* (2013.01); *H04W 52/383* (2013.01); *H04W 74/006* (2013.01); *H04W 74/08* (2013.01); *H04L 69/22* (2013.01); *H04L 69/324* (2013.01); *H04W 80/02* (2013.01); *H04W 84/042* (2013.01)

(56) References Cited

U.S. PATENT DOCUMENTS

| | | | |
|---|---|---|---|
| 2009/0046631 A1 | 2/2009 | Meylan et al. | |
| 2009/0109912 A1 | 4/2009 | DiGirolamo et al. | |
| 2010/0232364 A1* | 9/2010 | Hsu ................... | H04W 74/085 370/328 |
| 2010/0278111 A1 | 11/2010 | Kashima et al. | |
| 2012/0051297 A1 | 3/2012 | Lee et al. | |
| 2012/0182896 A1 | 7/2012 | Jang et al. | |
| 2012/0207130 A1 | 8/2012 | Jang et al. | |
| 2016/0094400 A1 | 3/2016 | Liang et al. | |

FOREIGN PATENT DOCUMENTS

| | | |
|---|---|---|
| CN | 101841923 A | 9/2010 |
| CN | 101855936 A | 10/2010 |
| CN | 103460622 A | 12/2013 |
| WO | 2013/168946 A1 | 11/2013 |
| WO | 2014/194867 A1 | 12/2014 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 11)", 3GPP Draft, 3GPP TS 36.321 V11 .6.0, Mar. 26, 2015, XP050952077, Sophia-Antipolis Cedex, France.
Chinese Office Action dated Sep. 30, 2020, issued in Chinese Patent Application No. 201680021089.7.

* cited by examiner

METHOD AND APPARATUS FOR RECEIVING MAC PDU IN MOBILE COMMUNICATION SYSTEM

CROSS-REFERENCE TO RELATED APPLICATION(S)

This application is a continuation application of prior application Ser. No. 15/562,217, filed on Sep. 27, 2017, which is an International application No. PCT/KR2016/003695, filed on Apr. 8, 2016, which is based on and claims the benefit priority under 35 U.S.C. § 119(e) of a U.S. Provisional application Ser. No. 62/145,702, filed on Apr. 10, 2015, in the U.S. Patent and Trademark Office, the disclosure of which is incorporated by reference herein in its entirety

TECHNICAL FIELD

The present invention relates to a method and apparatus for receiving a MAC PDU at a terminal in a mobile communication system.

BACKGROUND ART

In order to satisfy increasing demands of radio data traffic after the commercialization of a 4G communication system, efforts at developing an advanced 5G communication system or a pre-5G communication system have been made. For this reason, the 5G communication system or the pre-5G communication system is also referred to as a beyond-4G network communication system or a post-LTE system. In order to accomplish a higher data transfer rate, the 5G communication system considers implementation at a super-high frequency (mmWave) band (e.g., such as a 60 GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system. Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like. Besides, in the 5G communication system, a hybrid FSK and QAM modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

Meanwhile, the Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication, network infrastructure, service interface technology, and security technology are required. Thus, recently, technologies such as a sensor network, machine-to-machine (M2M), and machine type communication (MTC) are studied. In the IoT environment, an intelligent Internet technology (IT) service can be provided that collects and analyzes data generated from connected things and thereby creates new value in a human life. The IoT can be applied to fields of smart home, smart building, smart city, smart car or connected car, smart grid, health care, smart home appliance, and advanced medical service through the fusion of existing information technology (IT) and various industries.

Accordingly, various attempts are now made to apply the 5G communication system to the IoT network. For example, technologies such as a sensor network, machine-to-machine (M2M), and machine type communication (MTC) are implemented by techniques such as beamforming, MIMO, and array antennas which belong to the 5G communication technology. To apply a cloud radio access network (cloud RAN) for the above-mentioned big data processing technology is an example of the fusion of the 5G technology and the IoT technology.

As one of many technologies to meet increasing demands of high-capacity communications, a scheme of providing multiple connections has been proposed. For example, a carrier aggregation (CA) scheme in the long term revolution (LTE) system can provide multiple connections through a plurality of carriers. Accordingly, the user can be provided with a service through much more resources. In addition, various services including a broadcast service such as MBMS can be provided through the LTE system.

DISCLOSURE OF INVENTION

Technical Problem

However, when a terminal receives a certain value not used (i.e., a reserved value) in a previous release but redefined to be used in a new release, there occurs a problem that the terminal does not understand the received value. Therefore, an efficient method for solving this problem is needed.

Solution to Problem

In order to solve the above problems, the present invention provides a method for receiving a medium access control (MAC) packet data unit (PDU) in a wireless communication system. The method comprises steps of receiving the MAC PDU transmitted by a base station; determining whether a reserved value is contained in the MAC PDU; and identifying a type of the MAC PDU.

Additionally, if the reserved value is contained in the MAC PDU, if the MAC PDU is received on a multicast channel, and if the reserved value is contained in a sub-header of the MAC PDU, the sub-header and a payload portion corresponding to the sub-header are ignored, and other sub-headers and corresponding payload portions are processed.

In addition, a terminal for receiving a medium access control (MAC) packet data unit (PDU) in a wireless communication system comprises a transceiver configured to transmit and receive a signal to and from a base station; and a controller configured to receive the MAC PDU transmitted by the base station, to determine whether a reserved value is contained in the MAC PDU, and to identify a type of the MAC PDU.

Advantageous Effects of Invention

According to a method for receiving a MAC PDU at a terminal according to an embodiment of the present invention, it is possible to provide information to various terminals through a single MAC PDU by defining a terminal operation to be able to use a reserved value for any other purpose in the future.

MODE FOR THE INVENTION

Figure 1:
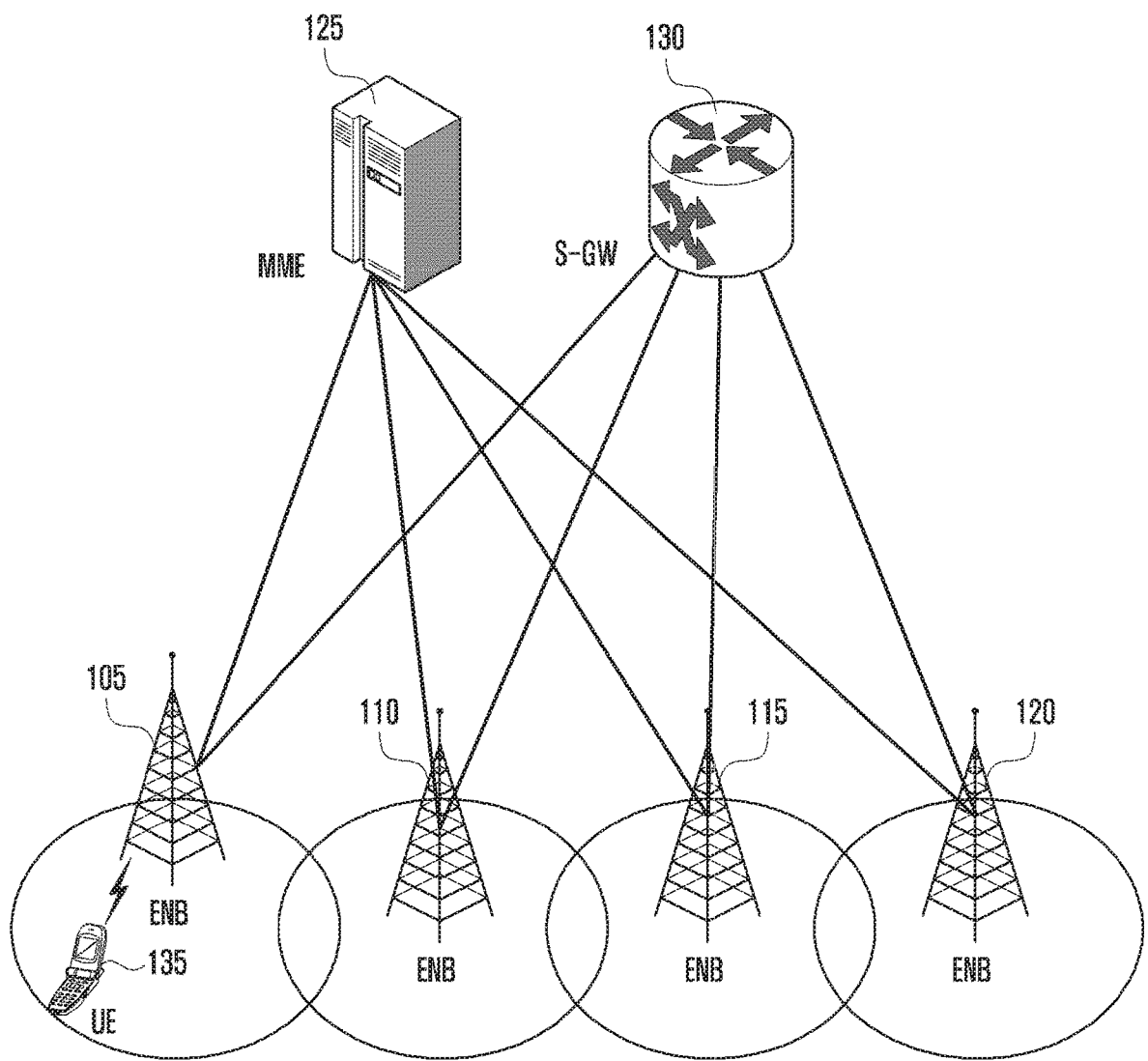
FIG. 1 illustrates network architecture of a wireless communication system according to an embodiment of the present invention.

Hereinafter, embodiments of the present invention will be described with reference to the accompanying drawings.

In the following description of embodiments, descriptions of techniques that are well known in the art and not directly related to the present invention are omitted. This is to clearly convey the gist of the present invention by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

In the following description of the present invention, a detailed description of known functions and configurations incorporated herein will be omitted when it may make the subject matter of the present invention rather unclear. Hereinafter, embodiments of the present invention will be described in detail with reference to the accompanying drawings.

Embodiment 1

In describing the present invention hereinafter, various abbreviations and terms follow the specifications 3GPP TS 36.211, 36.212, 36.213, 36.300, 36.321, 36.322, 36.323, 36.331, etc.

FIG. 1 is a diagram illustrating a structure of an LTE system to which the present invention is applied.

Referring to FIG. 1, a radio access network of the LTE system includes an evolved Node B (hereinafter, referred to as an ENB, a Node B, or a base station) 105, 110, 115 and 120, a mobility management entity (MME) 125, and a serving-gateway (S-GW) 130. User equipment (hereinafter, referred to as UE or terminal) 135 accesses the external network through the ENBs 105, 110, 115 and 120 and the S-GW 130.

In an embodiment, the ENB 105, 110, 115 or 120 corresponds to an existing Node B of a universal mobile telecommunication system (UMTS). The ENB is connected to the UE 135 via a radio channel and performs a more complex function than the existing Node B. In the LTE system, since all user traffic including a real-time service such as voice over IP (VoIP) through Internet protocol is served through a shared channel, a device for collecting status information of UEs such as buffer status, available transmission power status, and channel status to perform scheduling is required. The ENBs 105, 110, 115 and 120 take charge of this.

One ENB normally controls a plurality of cells. In order to achieve a transmission rate of 100 Mbps, the LTE system uses orthogonal frequency division multiplexing (OFDM) as a radio access technology in a 20 MHz bandwidth. In addition, an adaptive modulation & coding (AMC) scheme is applied to determine a modulation scheme and a channel coding rate, based on a channel status of the UE.

The S-GW 130 is a device for providing a data bearer and generates or removes the data bearer under the control of the MME 125. The MME is a device for performing various control functions as well as a mobility management function for the UE and is connected to a plurality of ENBs.

Figure 2:
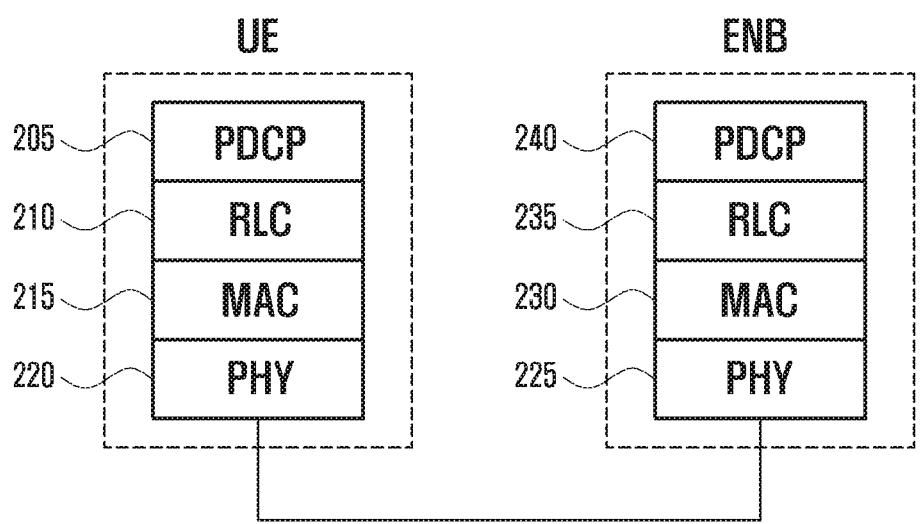
FIG. 2 is a diagram illustrating a wireless protocol structure of a wireless communication system according to an embodiment of the present invention.

FIG. 2 is a diagram illustrating a wireless protocol structure in an LTE system to which the present invention is applied.

Referring to FIG. 2, in each of the UE and the ENB, a wireless protocol of the LTE system is composed of a packet data convergence protocol (PDCP) 205 or 240, a radio link control (RLC) 210 or 235, and a medium access control (MAC) 215 or 230.

The PDCP 205 or 240 performs operations such as IP header compression and decompression, and the RLC 210 or 235 reconfigures a PDCP packet data unit (PDCP PDU) to an appropriate size and performs an ARQ operation and the like. The MAC 215 or 230 is connected to a plurality of RLC layer devices configured in one UE, and performs an operation of multiplexing RLC PDUs into a MAC PDU and demultiplexing the RLC PDUs from the MAC PDU. A physical layer 220 or 225 channel-codes and modulates upper layer data in the form of OFDM symbols and then transmits the OFDM symbols to a radio channel, or demodulates and channel-decodes the OFDM symbols received through the radio channel and then deliver them to the upper layer.

Figure 3A:
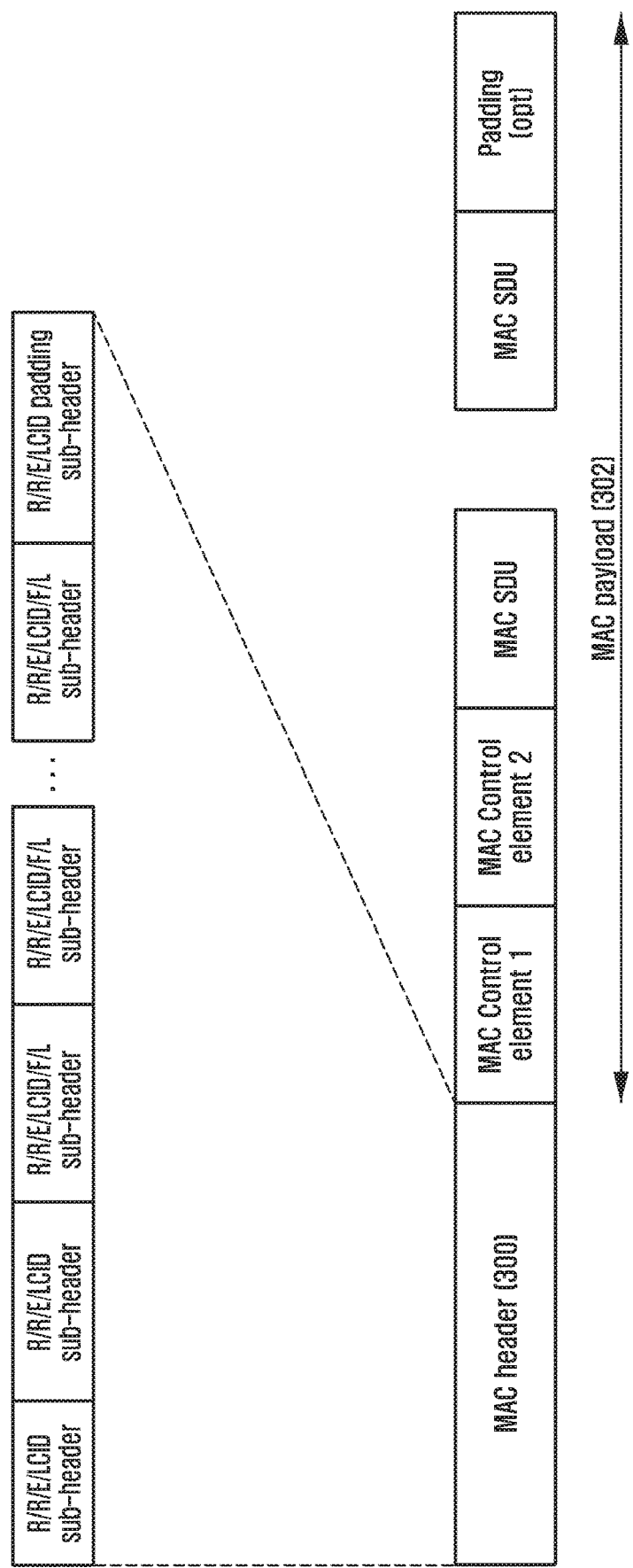
FIGS. 3A and 3B are diagrams illustrating a first MAC PDU structure and a second MAC PDU structure, respectively.
Figure 3B:
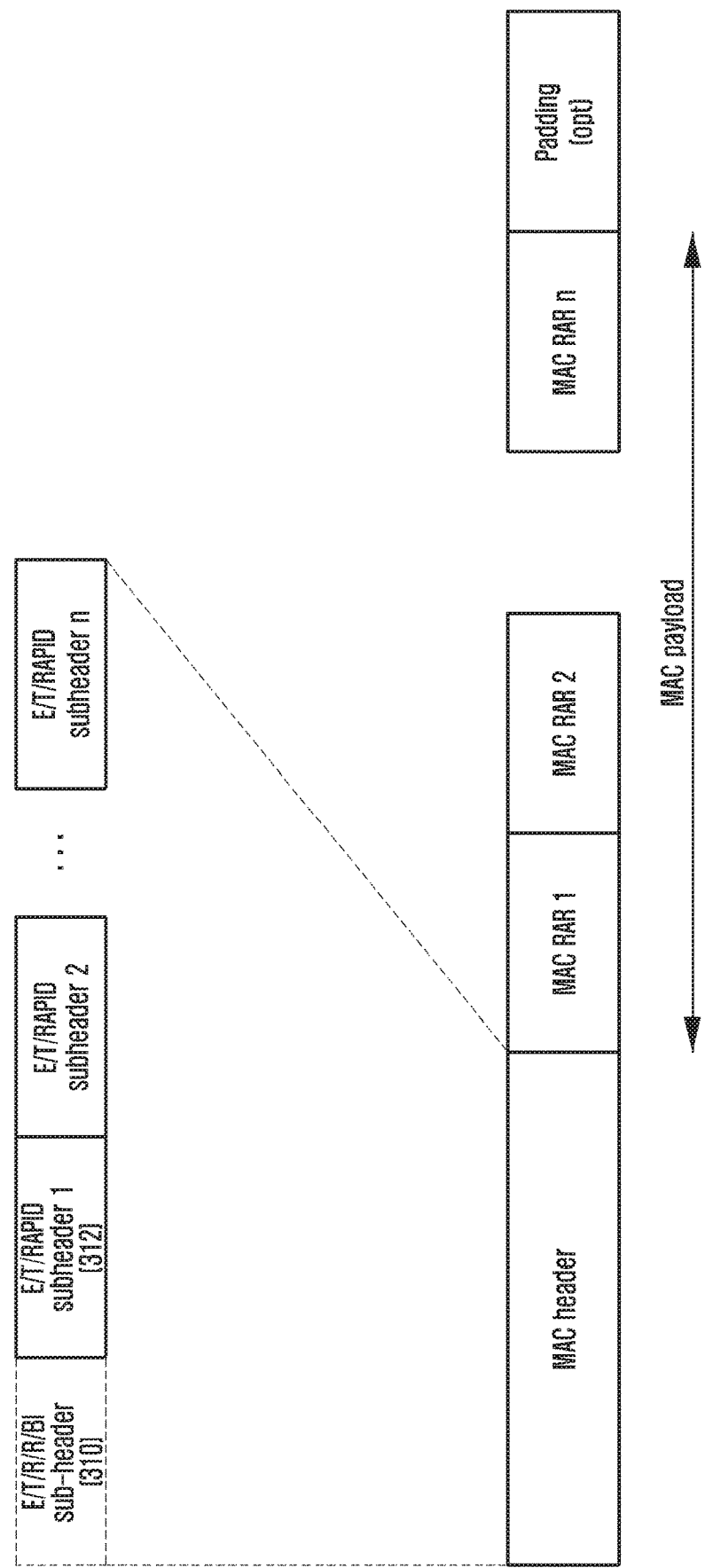

FIGS. 3A and 3B are diagrams illustrating a first MAC PDU structure and a second MAC PDU structure, respectively. The first MAC PDU is a MAC PDU transmitted and received through a multicast channel (MCH) and a MAC PDU transmitted and received through a downlink shared channel (DL-SCH) and not corresponding to a random access response (RAR) message. The second MAC PDU is a MAC PDU corresponding to the RAR message.

The first MAC PDU of FIG. 3A is composed of a MAC header 300 and a MAC payload 302. The MAC header includes at least one sub-header, and one sub-header corresponds one-to-one with one MAC control element (MAC CE) or one MAC service data unit (MAC SDU).

The sub-header includes a logical channel ID (LCID) field, and the LCID field indicates the type of corresponding MAC CE or MAC SDU. The meaning of LCID values when the MAC PDU is transmitted and received through the DL-SCH is shown in Table 1 below.

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

The meaning of LCID values when the MAC PDU is transmitted and received through the MCH is shown in Table 2 below.

TABLE 2

| Index | LCID values |
| --- | --- |
| 00000 | MCCH (see note) |
| 00001-11100 | MTCH |
| 11101 | Reserved |
| 11110 | MCH Scheduling Information or Extended MCH Scheduling Information |
| 11111 | Padding |

The second MAC PDU of FIG. 3B is composed of a MAC header and a MAC payload. The MAC header includes zero or one E/T/R/R/BI sub-header 310 and zero, one, or a plurality of E/T/RAPID sub-headers 312. The MAC payload includes zero, one, or a plurality of MAC RARs, and one E/T/RAPID corresponds to one MAC RAR.

Figure 3C:
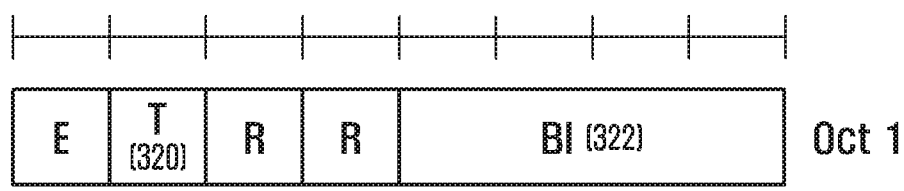
FIG. 3C is a diagram illustrating a structure of E/T/R/R/BI sub-header.

FIG. 3C is a diagram illustrating a structure of E/T/R/R/BI sub-header.

Referring to FIG. 3C, a type (T) field 320 indicates whether a corresponding sub-header includes a backoff indicator (BI) or a random access preamble identifier (RAPID). The BI 322 indicates whether to have to apply backoff for random access. The UE that is in a random access state performs the retransmission of preamble after waiting for a value stored in a backoff parameter. The backoff parameter is set as a value indicated in the BI field. The BI field has a value between 0 and 15, and each of 0 to 12 corresponds to a value between 0 and 960 ms. 13, 14 and 15 are unused values (also referred to as reserved values).

Figure 3D:
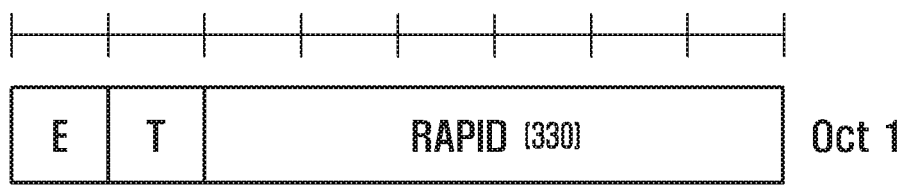
FIG. 3D is a diagram illustrating a structure of E/T/ RAPID sub-header.

FIG. 3D is a diagram illustrating a structure of E/T/RAPID sub-header.

Referring to FIG. 3D, the RAPID 330 is an integer between 0 and 63, and corresponds one-to-one with a random access preamble used in the system. If there is a RAPID corresponding to a transmitted preamble from among RAPIDs of the received second MAC PDU, the UE determines that a relevant RAR is a valid RAR transmitted to the UE, and processes the RAR.

Figure 3E:
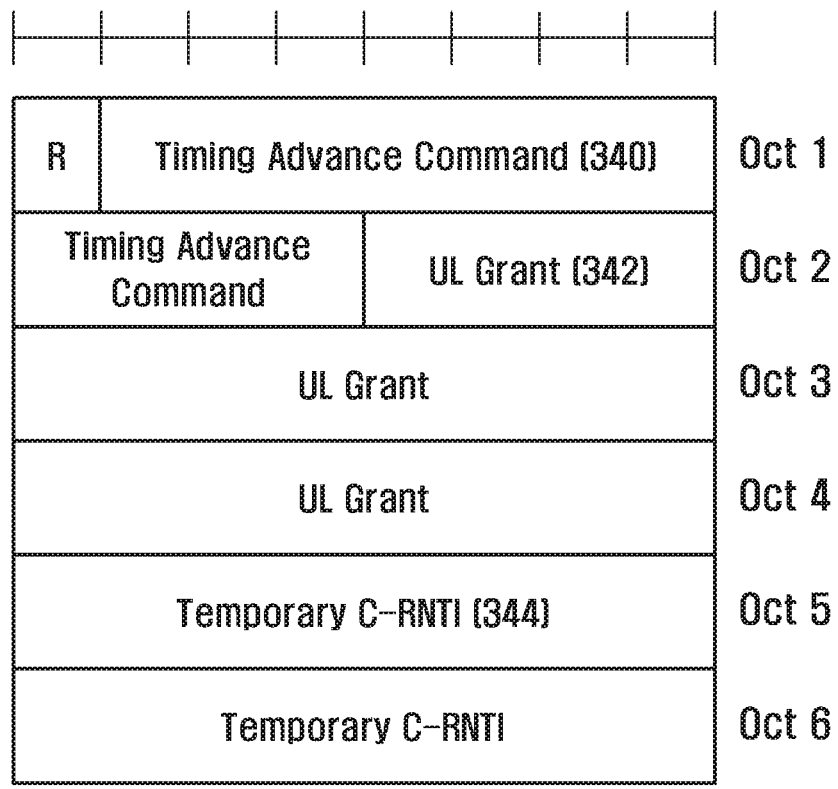
FIG. 3E is a diagram illustrating a structure of MAC RAR.

FIG. 3E is a diagram illustrating a structure of MAC RAR.

Referring to FIG. 3E, the RAR is composed of a timing advance command (TA command) 340, a UL grant 342, and a temporary cell-radio network temporary identifier (temporary C-RNTI) 344. Using such information, the UE performs uplink transmission (or Msg 3 transmission).

Some values of the UL grant field are reserved values, and FFF4-FFFC of the temporary C-RNTI is also a reserved value.

As described above, various kinds of reserved values may exist in the MAC PDU. A value defined as a reserved value in the Release (hereinafter, also referred to as Rel)-x should not be transmitted to Rel-x UE because the Rel-x UE does not know how to interpret the reserved value. However, even though used as a reserved value in Rel-x, this value may be used for other purposes in Rel-y (y>x). For example, in Rel-13, LCID 01011 may be used as a value for specifying a new MAC CE. In this case, the ENB may transmit such a new LCID to UE capable of understanding the new LCID, i.e., Rel-13 (or later) UE.

Like this, in case of clearly recognizing the Rel of the UE, the ENB does not need to and should not transmit a MAC PDU including a reserved value to the UE. An example is a unicast MAC PDU that the UE and the ENB exchange the MAC PDU one-to-one. The unicast MAC PDU includes a first MAC PDU transmitted through the DL-SCH.

On the other hand, in case of a multicast MAC PDU that the ENB and the UEs exchange the MAC PDUs one-to-many, the ENB may not know the Rel of all UEs. Therefore, if the ENB transmits a value which is a reserved value in a previous Rel but is redefined to be not a reserved value in Rel-y, there occurs a problem that the UE of the previous Rel does not understand such a new value. In order to solve this problem, it is conceivable to transmit the multicast MAC PDU separately for each Rel of the UE, but this is extremely inefficient.

In the present invention, in order to transmit one multicast MAC PDU to UEs of several Rels, the UE performs an operation different from the unicast MAC PDU when finding a reserved value in the multicast MAC PDU. The multicast MAC PDU includes a first MAC PDU transmitted on the MCH and a second MAC PDU transmitted on the DL-SCH.

Figure 4:
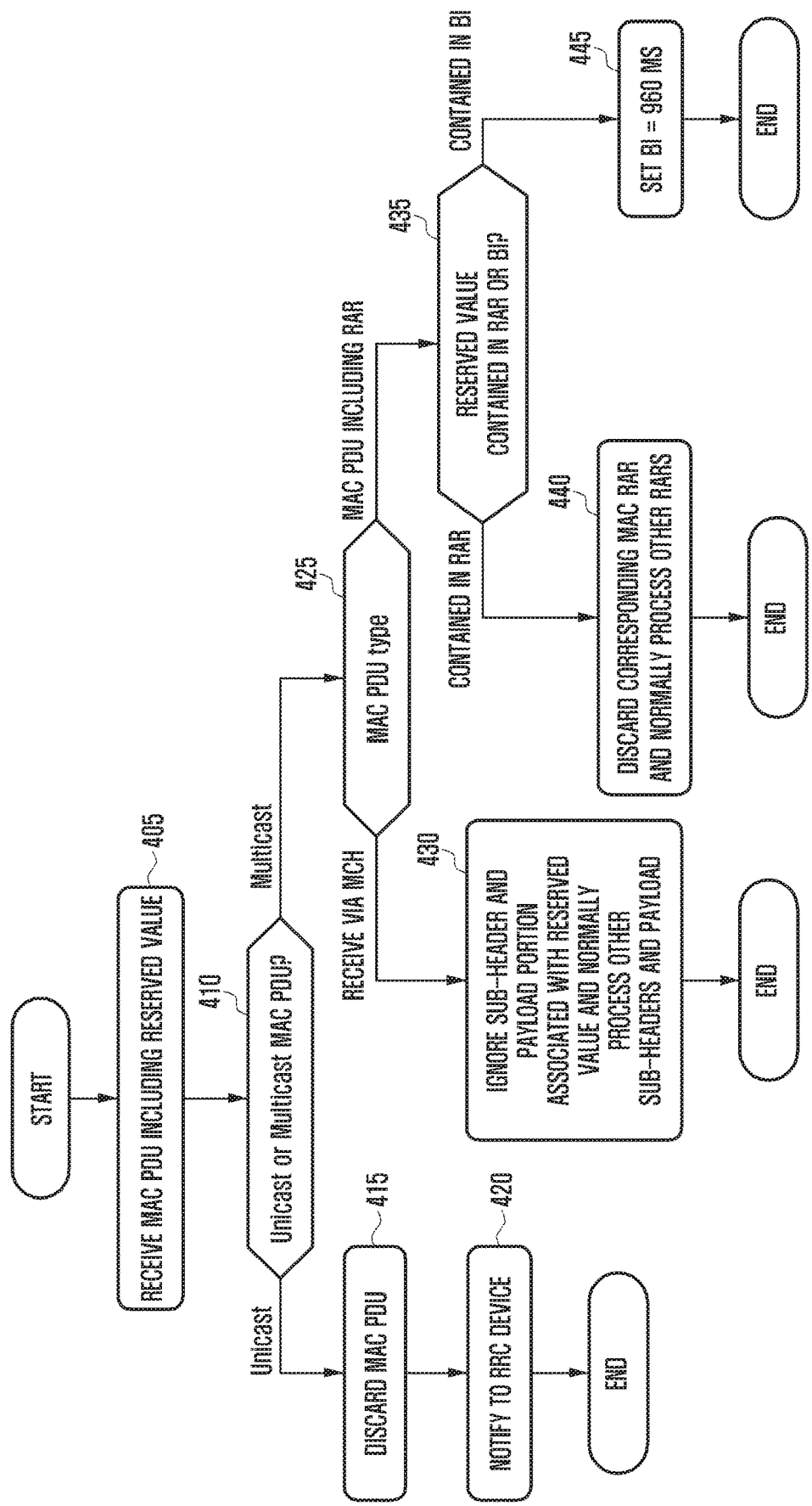
FIG. 4 is a diagram illustrating an operation of a terminal according to an embodiment of the present invention.

FIG. 4 is a diagram illustrating an operation of a terminal according to an embodiment of the present invention.

Referring to FIG. 4, at step 405, the UE receives a MAC PDU including a reserved value, and checks at step 410 whether the MAC PDU is a unicast MAC PDU or a multicast MAC PDU. If the MAC PDU is a unicast MAC PDU, step 415 is performed. If the MAC PDU is a multicast MAC PDU, step 425 is performed.

At step 415, the UE discards the entire received (unicast) MAC PDU, and proceeds to step 420. At step 420, a MAC device of the UE notifies an RRC device of the UE that the MAC PDU including the reserved value is received. Since this event is an event that should not occur in a normal situation, the UE notifies this to the ENB by using a predetermined RRC control message or recognizes this as a radio link failure and initiates an RRC connection reestablishment process.

At step 425, the UE identifies the type of the multicast MAC PDU including the reserved value. If the received multicast MAC PDU is the first MAC PDU received through the MCH, the UE proceeds to step 430. If the received multicast MAC PDU is the second MAC PDU received through the DL-SCH (namely, the MAC PDU includes the RAR), the UE proceeds to step 435.

At step 430, the UE performs the following operation. If the reserved value in the first MAC PDU is included in the MAC header, the UE ignores a MAC sub-header including the reserved value and a payload portion such as a MAC CE or a MAC SDU corresponding to the sub-header, and normally processes the other sub-headers and the corresponding payload portions. If the reserved value is included in a payload portion such as a MAC CE or a MAC SDU, the UE ignores the corresponding payload portion and a MAC sub-header mapped to the payload portion, and normally processes the other sub-headers and the corresponding payload portions.

At step 435, the UE determines whether the reserved value in the second MAC PDU is included in a sub-header or in a payload (i.e., a MAC RAR). If the reserved value is included in the MAC RAR, the UE proceeds to step 440. If the reserved value is included in the sub-header (or BI), the UE proceeds to step 445. At step 440, the UE discards (or ignores) the MAC RAR including the reserved value and the corresponding sub-header, and normally processes the other MAC RARs. At step 445, the UE sets a backoff parameter to a predetermined value, e.g., the longest backoff value.

In summary, when the unicast MAC PDU including the reserved value is received, the UE discards the entire corresponding MAC PDU, and when the multicast MAC PDU including the reserved value is received, the UE identifies whether the received MAC PDU is the first MAC PDU received via the MCH or the second MAC PDU received via the DL-SCH. In case of the first MAC PDU, the UE ignores (or discards) only a payload portion (e.g., MAC CE) including the reserved value and a sub-header associated with the payload portion. If the received MAC PDU is the second MAC PDU, and if the reserved value is included in a sub-header, the UE interprets the reserved value as a predetermined value and processes it. If the reserved value is included in a payload (i.e., MAC RAR), the UE ignores (or discards) the corresponding payload portion (i.e., the corresponding MAC RAR) and the associated sub-header and normally processes the other sub-headers and payloads.

Figure 5:
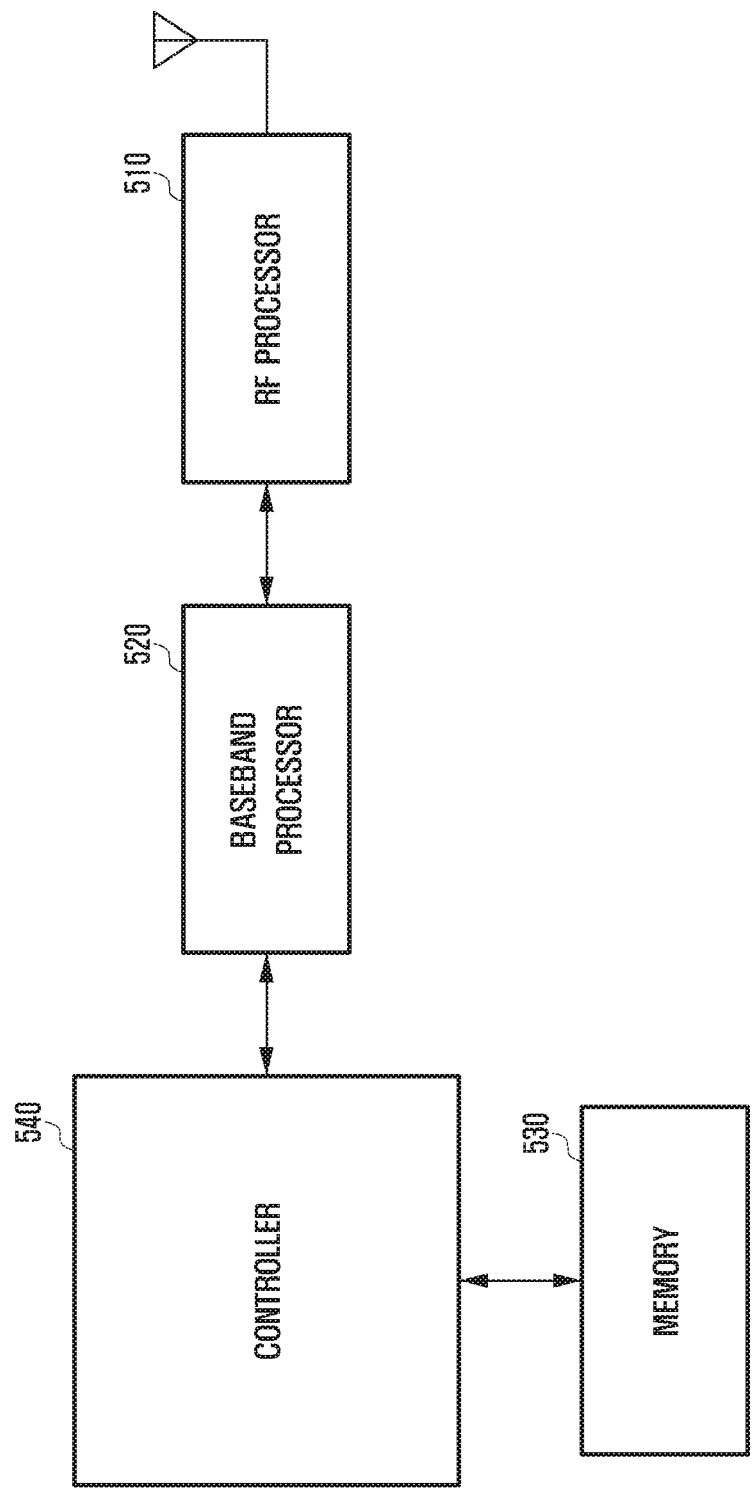
FIG. 5 is a diagram illustrating a block configuration of a terminal in a wireless communication system according to an embodiment of the present invention.

FIG. 5 is a diagram illustrating a block configuration of a terminal in a wireless communication system according to an embodiment of the present invention.

Referring to FIG. 5, the UE includes a radio frequency (RF) processor 510, a baseband processor 520, a memory 530, and a controller 540.

The RF processor 510 performs a function of transmitting and receiving a signal through a radio channel, such as band conversion and amplification of the signal. Namely, the RF processor 510 up-converts a baseband signal, provided from the baseband processor 520, into an RF band signal, transmits the RF band signal through an antenna, and down-converts an RF band signal, received through the antenna, into a baseband signal. For example, the RF processor 510 may include a transmission filter, a reception filter, an amplifier, a mixer, an oscillator, a digital to analog converter (DAC), an analog to digital converter (ADC), and the like. Although only one antenna is shown in FIG. 5, the UE may have a plurality of antennas. In addition, the RF processor 510 may include a plurality of RF chains. Further, the RF processor 510 may perform beamforming. For the beamforming, the RF processor 510 may adjust the phase and size of each signal transmitted and received through a plurality of antennas or antenna elements.

The baseband processor 520 performs a function of conversion between a baseband signal and a bit string according to a physical layer specification of the system. For example, in case of transmitting data, the baseband processor 520 generates complex symbols by encoding and modulating a transmission bit string. Also, in case of receiving data, the baseband processor 520 restores a reception bit string by demodulating and decoding a baseband signal provided from the RF processor 510. For example, in accordance with the OFDM scheme, in case of transmitting data, the baseband processor 520 generates complex symbols by encoding and modulating a transmission bit string, maps the complex symbols to subcarriers, and constructs OFDM symbols through the inverse fast Fourier transform (IFFT) operation and the cyclic prefix (CP) insertion. Also, in case of receiving data, the baseband processor 520 divides a baseband signal provided from the RF processor 510 into units of OFDM symbols, restores signals mapped to subcarriers through the fast Fourier transform (FFT) operation, and restores a reception bit string through demodulation and decoding.

The baseband processor 520 and the RF processor 510 transmit and receive signals as described above. Accordingly, the baseband processor 520 and the RF processor 510 may be referred to as a transmitter, a receiver, a transceiver, or a communication unit. Further, at least one of the baseband processors 520 and the RF processor 510 may include a plurality of communication modules to support a plurality of different radio access technologies. Also, at least one of the baseband processors 520 and the RF processor 510 may include different communication modules to process signals of different frequency bands. For example, the different radio access technologies may include a wireless LAN (e.g., IEEE 802.11), a cellular network (e.g., long term evolution (LTE)), and the like. In addition, the different frequency bands may include a super high frequency (SHF, e.g., 2.5 GHz, 5 GHz) band, and a millimeter wave (mm-wave, e.g., 60 GHz) band.

The memory 530 stores a basic program for operations of the UE, an application program, and data such as setting information. The memory 530 provides the stored data in response to a request of the controller 540.

The controller 540 controls overall operations of the UE. For example, the controller 540 transmits and receives signals through the baseband processor 520 and the RF processor 510. Also, the controller 540 writes or reads data in or from the memory 540. For this, the controller 540 may include at least one processor. For example, the controller 540 may include a communication processor (CP) for controlling communication and an application processor (AP) for controlling an upper layer such as an application program. According to an embodiment of the present invention, the controller 540 may control the UE to perform operations and procedures of the UE shown in FIGS. 2, 3 and 4.

Embodiment 2

Hereinafter, technologies for providing multiple connections in a wireless communication system will be described.

In the following description, terms for identifying a connection node, terms for indicating network entities, terms for indicating messages, terms for indicating an interface between network objects, terms for indicating various kinds of identification information, etc. are exemplary only for convenience of explanation. Therefore, the present invention is not limited by the following terms, and other terms having equivalent technical meanings may be used.

For convenience of explanation, the present invention uses terms and names defined in the 3rd generation partnership project long term evolution (3GPP LTE) and the institute of electrical and electronic engineers (IEEE) 802.11 standards. However, the present invention is not limited by such terms and names, and may be equally applied to systems that conform to other standards.

Hereinafter, embodiments of the present invention for providing multiple connections using a wires local area network (WLAN), such as, but not limited to, IEEE 802.11 or Wi-Fi, in a cellular communication system will be described. However, any radio access technology (RAT) other than WLAN may be applied.

Figure 6:
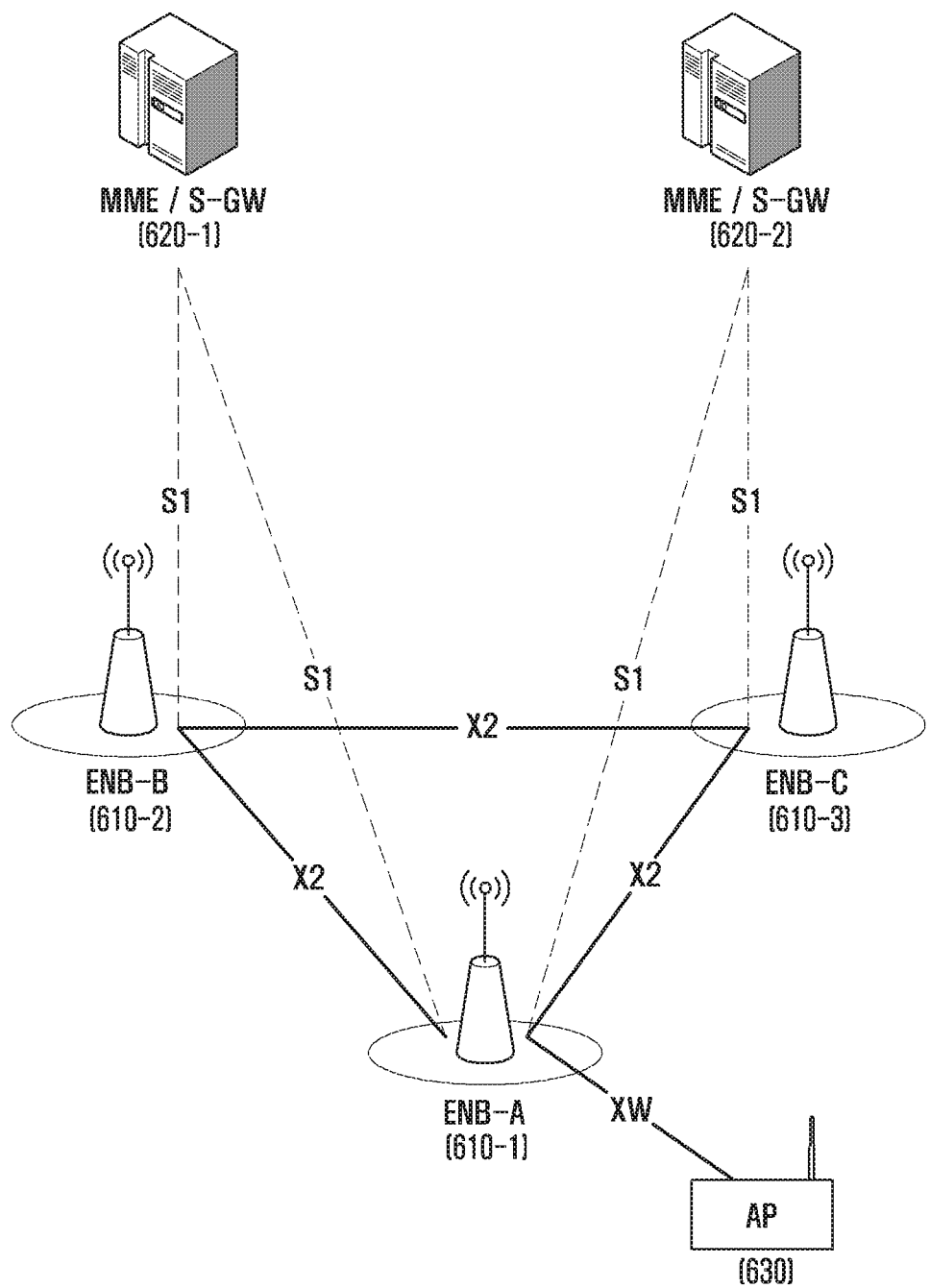
FIG. 6 is a diagram illustrating an example of network architecture of a wireless communication system according to an embodiment of the present invention.

FIG. 6 is a diagram illustrating an example of network architecture of a wireless communication system according to an embodiment of the present invention.

Referring to FIG. 6, the wireless communication system includes an evolved Node B (also referred to as an ENB, a Node B, or a base station)-A 610-1, an ENB-B 610-2, an ENB-C 610-3, a mobility management entity (MME)/serving-gateway (S-GW) 620-1, an MIME/S-GW 620-2, and an access point (AP) 630. Although three ENBs are shown, there may be two, four or more ENBs. Each of the MME/S-GWs 620-1 and 620-2 may be separated into an MME and an S-GW.

The ENBs 610-1, 610-2, and 610-3 are access nodes of the cellular network and provide radio access to user equipment (also referred to as UE or a terminal) attached to the network. Namely, the ENBs 610-1, 610-2, and 610-3 support connections between the UEs and a core network. According to various embodiments of the present invention, the ENB-A 610-1 may provide multiple connections to the UE by using the AP 630.

The MME/S-GWs 620-1 and 620-2 manage the mobility of the UE. Also, the MME/S-GWs 620-1 and 620-2 may further perform authentication for the UE attached to the network, bearer management, and the like. The MIME/S-GWs 620-1 and 620-2 process packets arriving from the ENBs 610-1, 610-2 and 610-3 or packets to be forwarded to the ENBs 610-1, 610-2 and 610-3.

The AP 630 is an access node of the WLAN and provides radio access to the UEs. In particular, according to various embodiments of the present invention, the AP 630 may provide a WLAN-based connection for multiple connections to the UE under the control of the ENB-A 610-1. According to an embodiment of the present invention, the AP 630 may be included in the ENB-A 610-1 or connected to the ENB-A 610-1 through a separate interface. In this case, the ENB-A 610-1 may transmit, to the UE, a part of downlink data directly and the remaining data through the AP 630. In addition, the UE may transmit a part of uplink data to the ENB-A 610-1 and the rest to the AP 630.

The UE may access the cellular network through the ENB-A 610-1. According to an embodiment of the present invention, the ENB-A 610-1 may control the UE to communicate using a wider band by further setting the access to the AP 630 to the UE. At this time, even though core network equipment (e.g., MME, S-GW, packet data network gateway (P-GW), or the like) does not recognize that multiple connections are established using the AP 630 in a wireless section, a service using the AP may be provided.

When multiple connections are provided using the AP 630, it should be determined which connection the data should be delivered to. For example, in case of downlink transmission, the ENB-A 610-1 may receive data from the core network and determine whether to transmit the data through the WLAN or directly. Also, in case of uplink transmission, the ENB-A 610-1 may determine a route to be used for data transmission and transmit received data to the core network.

When the UE transmits and receives data using both the LTE technology and the WLAN technology, the LTE uplink transmission and the WLAN uplink transmission may overlap with each other. Since the total amount of transmission power from one UE is strictly regulated, the sum of power of both uplink transmissions should not exceed a predetermined threshold.

The LTE uplink transmission is subjected to transmission power control by the ENB, whereas the Wi-Fi uplink transmission is performed at full power. In addition, the LTE uplink transmission depends on a passive control of the ENB, whereas the Wi-Fi uplink transmission allows both passive and active controls. For example, since the UE that receives the WLAN MAC PDU from the AP should transmit an acknowledgment (ACK) signal at a given time, the ACK signal transmission of the UE may be regarded as a passive transmission. However, the MAC PDU transmission of the UE may be regarded as an active transmission in which the UE itself determines a transmission time.

The present invention provides a method and apparatus for adjusting the transmission power of each uplink by applying a predetermined rule when a time duration of LTE uplink transmission and a time duration of Wi-Fi uplink transmission are overlapped even partially.

Figure 7:
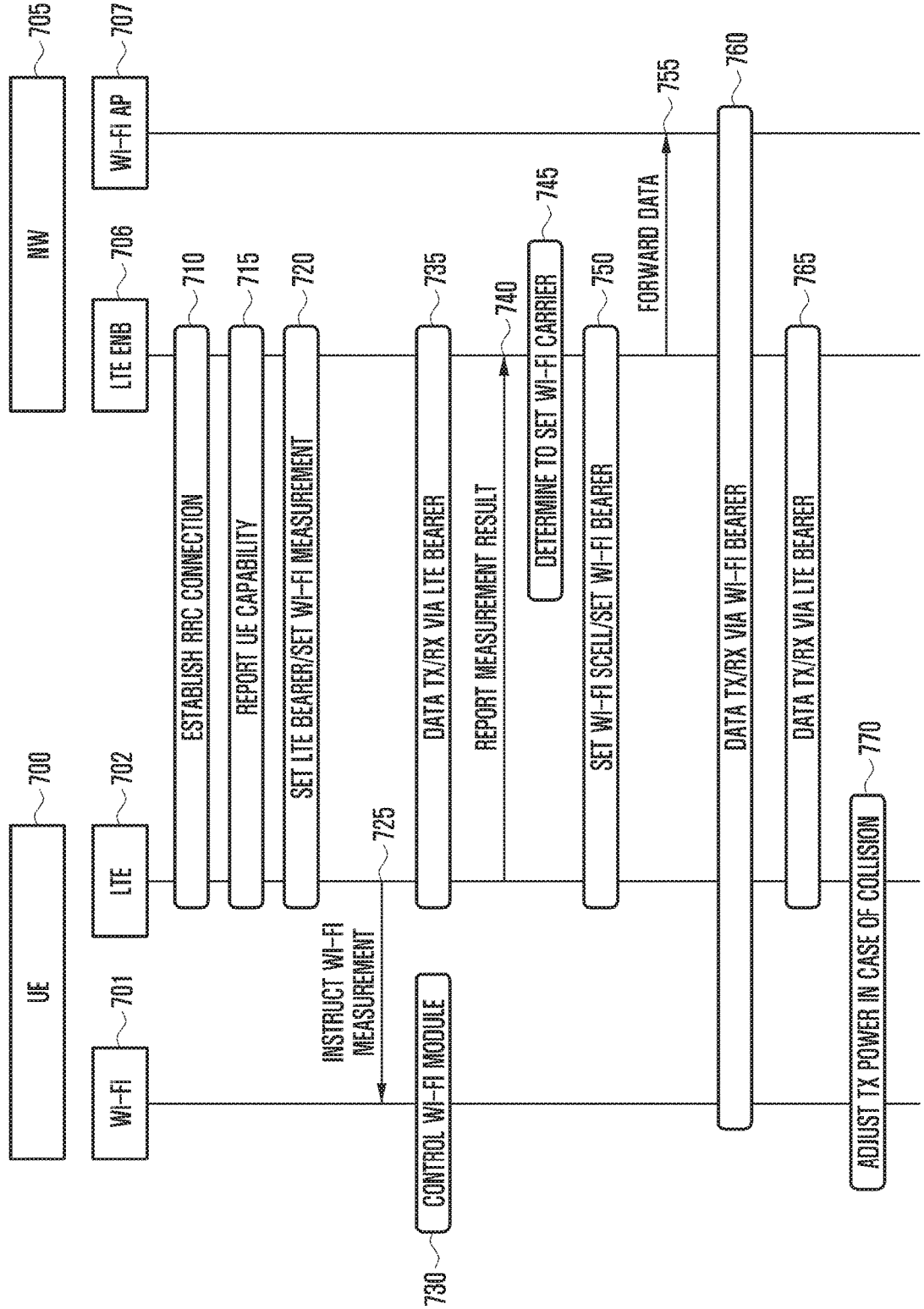
FIG. 7 is a diagram illustrating the entire operation of the present invention.

FIG. 7 is a diagram illustrating the entire operation of the present invention. For convenience, a network 705 including an LTE ENB and a Wi-Fi AP is illustrated as a single node. However, the LTE ENB and the Wi-Fi AP may be located at the same physical location or at different physical locations, even though it is merely characterized that the LTE ENB 706 controls the Wi-Fi AP 707.

A UE 700 includes both a Wi-Fi transceiver or module 701 and an LTE transceiver or module 702. The UE 700 has a device for operating Wi-Fi as if it is part of an LTE radio bearer, and recognizes a procedure. In the following description, operating Wi-Fi as if it is part of the LTE radio bearer will be called LTE-WiFi integrated technology.

Referring to FIG. 7, at step 210, the UE 700 establishes an RRC connection with the ENB 706 at a certain time. The RRC connection establishment is performed through a procedure in which the UE transmits a control message, called RRCConnectionRequest, for requesting the RRC connection establishment to the ENB through a random access process, the ENB transmits an RRCConnectionSetup message for instructing the RRC connection establishment to the UE, and the UE that establishes the RRC connection transmits an RRCConnectionSetupComplete message to the ENB. The UE that establishes the RRC connection may perform LTE communication via the ENB by using the LTE module 702.

The ENB and the UE may perform various types of LTE communication, and the UE 700 reports its own capability to the ENB 706 at step 215 so as to determine whether to use an optional function such as carrier aggregation or multi-input multi-output (MIMO). The UE capability report procedure includes a process in which the ENB transmits a control message called UECapabilityEnquiry to the UE, and a process in which the UE transmits a control message called UECapabilityInformation to the ENB.

The UECapabilityEnquiry contains RAT-Type which is information for indicating the type of RAT to be reported by the UE. The RAT-Type indicates one of GERAN, UTRAN, EUTRAN, and WLAN, and one or more RAT-Types may be indicated in one UECapabilityEnquiry message.

If the RAT-Type is indicated as WLAN, the UE inserts the following information in the UECapabilityInformation control message and reports it to the ENB.

A list of Wi-Fi channels to which LTE-Wi-Fi integrated technology can be applied.

A list of Wi-Fi versions/types to which LTE-Wi-Fi integrated technology can be applied (e.g., 802.11n, 802.11ad, etc.).

The LTE ENB 706 determines whether to apply the LTE-Wi-Fi integrated technology to the UE, based on various considerations such as the capability of the UE and the channel status of the UE. When it is determined to apply the LTE-Wi-Fi integrated technology, the LTE ENB 706 performs an RRC connection reconfiguration procedure with the UE at step 720 so as to establish an LTE bearer to the UE 700 and set a measurement for the Wi-Fi network. The RRC connection reconfiguration procedure includes a process in which the ENB transmits an RRCConnectionReconfiguration control message to the UE, and a process in which the UE transmits a RRCConnectionReconfigurationComplete message to the ENB.

The RRCConnectionReconfiguration message contains LTE bearer setting information, Wi-Fi measurement information, and the like. An LTE bearer is composed of a packet data convergence protocol (PDCP) device and a radio link control (RLC) device. The Wi-Fi measurement information refers to information about a Wi-Fi network and a Wi-Fi signal to be measured by the UE, including Wi-Fi channel information, Wi-Fi type information, identifier information of Wi-Fi AP, transmission time duration information of a Wi-Fi beacon signal, event information related to reporting Wi-Fi measurement results, and the like.

The transmission time duration information of the Wi-Fi beacon signal is information for specifying an approximate time to transmit the Wi-Fi beacon signal, and may be represented by a system frame number and a subframe number of the current LTE system. A transmission time duration of the Wi-Fi beacon signal forms a certain pattern, and such pattern information may include, for example, a system frame number and a subframe number for specifying a starting time point of the Wi-Fi beacon transmission time duration, information (e.g., several subframes) for specifying a length of the Wi-Fi beacon transmission time duration, information for specifying a period of the Wi-Fi beacon transmission time duration, and the like.

The Wi-Fi measurement result event may be defined to report a measure result when beacon signals having a channel quality greater than a predetermined threshold are received continuously more than n times, for example, in case of measuring the channel quality of Wi-Fi beacon signals transmitted by the Wi-Fi AP designated as a measurement target. The n may be defined as one value in the specification or may be indicated in the Wi-Fi measurement information. The n may be directly indicated or may be derived from a certain duration (time to trigger) where the Wi-Fi channel quality should be maintained at a predetermined level. For example, if the Wi-Fi beacon period is x ms and if the time to trigger is y ms, the n may be derived from the value of y divided by x.

When the Wi-Fi measurement is instructed, the UE 700 delivers the Wi-Fi measurement information to the Wi-Fi module 701 and instructs the measurement of a Wi-Fi signal at step 225. If the Wi-Fi module is already running at this time, the UE controls the Wi-Fi module to receive a beacon signal on the instructed Wi-Fi channel during at least a Wi-Fi beacon transmission time duration. If the Wi-Fi module is not running at this time, the UE first starts (i.e., turns on) the Wi-Fi module and controls the Wi-Fi module to perform the operation at step 730.

While the Wi-Fi module performs the measurement of a Wi-Fi signal, the UE transmits and receives data to and from the LTE ENB 706 by using the LTE module 702, an LTE radio frequency, and an LTE bearer at step 735. All downlink data to be transmitted to the UE by the LTE ENB are transmitted using the LTE radio frequency and the LTE bearer.

If the reception quality of a Wi-Fi beacon signal measured at a certain time satisfies a predetermined criterion, the UE 700 generates a measurement result report control message and transmits it to the ENB 706 at step 740. This control message contains information such as an identifier of an AP, an identifier of a Wi-Fi channel, and a Wi-Fi signal quality when the beacon signal reception quality satisfies the predetermined criterion.

The ENB 706 that receives the measurement result report control message determines to set a Wi-Fi carrier (or a Wi-Fi serving cell, or a Wi-Fi secondary cell, or a Wi-Fi SCell) to the UE at step 745, based on various considerations such as the Wi-Fi channel quality, the traffic amount of UE, and the load of current LTE cell.

The LTE ENB 706 and the UE 700 perform the RRC connection reconfiguration procedure for setting the Wi-Fi bearer and the Wi-Fi SCell. The RRCConnectionReconfiguration control message transmitted by the ENB may include the following information.

Information for specifying the Wi-Fi SCell, for example, Wi-Fi channel information and AP identifier information Wi-Fi bearer setting information, which is information about a bearer to transmit and receive data through the Wi-Fi SCell (A new Wi-Fi bearer may be established or the existing LTE bearer may be reestablished as the Wi-Fi bearer.)

The LTE ENB 706 forwards downlink data, to be transmitted through Wi-Fi, to the Wi-Fi AP 707 at step 755. The UE, the Wi-Fi AP 707, and the LTE ENB 706 transmit and receive data through the Wi-Fi bearer at step 760, and the UE 700 and the LTE ENB 707 transmit and receive data through the LTE bearer at step 765.

If the Wi-Fi uplink transmission and the LTE uplink transmission collide with each other, the UE adjusts the transmission power of both transmissions according to a predetermined rule at step 770.

Figure 8:
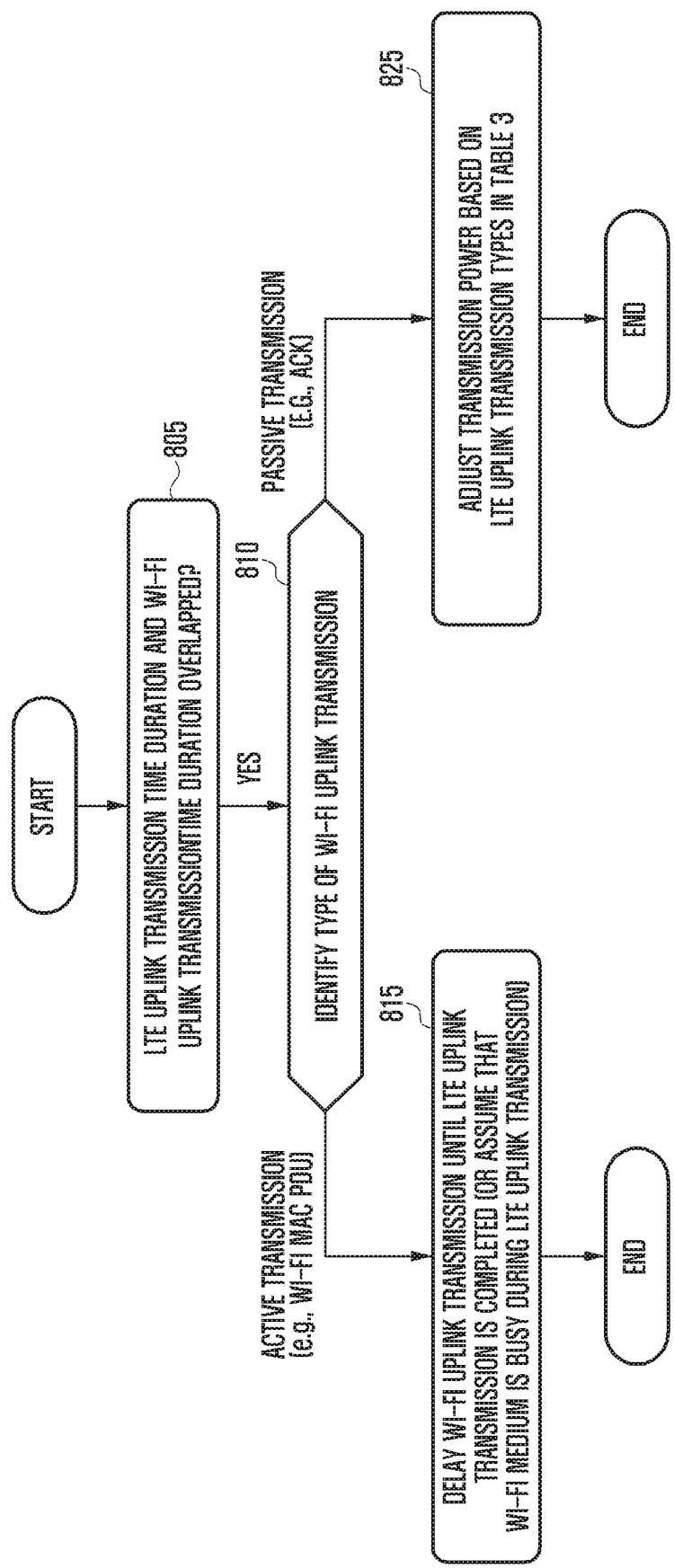
FIG. 8 is a diagram illustrating an example of a transmission power adjustment rule according to the present invention.

FIG. 8 is a diagram illustrating an example of a transmission power adjustment rule according to the present invention.

Referring to FIG. 8, the UE determines at step 805 whether a time duration of LTE uplink transmission and a time duration of Wi-Fi uplink transmission are overlapped even partially. If so, the UE adjusts transmission power for each uplink by applying a predetermined rule. Before adjusting the uplink transmission power of the LTE and the Wi-Fi, the UE identifies the type of a Wi-Fi uplink transmission signal at step 810 and may apply an appropriate power adjustment rule in consideration of the importance of a transmission signal.

If the Wi-Fi uplink transmission signal is normal data, it is not necessary to transmit data according to a requirement for a specific time. In other words, through scheduling, the Wi-Fi uplink data signal may be adjusted so as not to overlap with the LTE uplink transmission. In the present invention, this is referred to as active transmission. If the LTE uplink transmission and the active transmission overlap with each other in a time duration, the UE gives priority to the LTE uplink transmission at step 815. In general, Wi-Fi is used for the purpose of further increasing the signal transmission rate, so it is natural to give lower priority to Wi-Fi than to LTE. Therefore, the UE delays the Wi-Fi uplink transmission until the LTE uplink transmission is completed.

If UE transmission power remains except UE transmission power used for the LTE uplink transmission, the UE may utilize the remaining transmission power for the Wi-Fi uplink transmission. The Wi-Fi module may internally define and apply the operation associated with the delay, or assume that the frequency is 'BUSY (meaning preemptively used by another device)' during LTE uplink transmission. However, this approach of giving priority to the LTE uplink transmission has problems of drastically reducing the Wi-Fi transmission efficiency and of causing the minimum connection operation (association) for the Wi-Fi network to be not properly performed.

If the Wi-Fi uplink transmission signal is messages related to ACK/NACK, clear to send (CTS), probe request, and registration which are not easy to adjust transmission time through scheduling unlike normal data, it is undesirable to give priority to the LTE uplink signal unconditionally. This is because if the transmission of such a control signal fails to satisfy the predetermined time requirements, the Wi-Fi transmission efficiency drops sharply. In the present invention, this is referred to as passive transmission. In this case, the type of the LTE uplink signal is also considered at step 825 to determine which signal should be preferentially considered.

If the LTE uplink transmission in the overlapped time duration is for normal data (i.e., uplink data transmitted on a physical uplink shared channel (PUSCH)), the UE gives higher or equal priority to the Wi-Fi passive transmission. Therefore, the UE performs the Wi-Fi passive transmission with a higher or equal opportunity than the LTE uplink data transmission. The equal opportunity means 1) allocating power to each uplink transmission at the same or specific rate in the entire transmission power of the UE, or 2) giving priority to the preceding transmission and starting next transmission when the preceding transmission is completed.

Meanwhile, among the LTE uplink signals, there are signals having strict time requirements. Examples are a physical uplink control channel (PUCCH) signal including a scheduling request (SR), HARQ feedback information, and channel status information (CSI), a physical random access channel (PRACH) signal, and the like. Since LTE access itself is more important than Wi-Fi access, it is necessary to give higher priority to such uplink LTE control signals.

Table 3 below is an example of transmission power adjustment based on the LTE uplink transmission types in the present invention. At step 825 of FIG. 8, the UE may control the uplink transmission power according to Table 3. The PUSCH is used for transmitting normal LTE uplink data, and the PUCCH is a channel used for transmitting an LTE control signal on uplink. Information included in the PUCCH should satisfy specific time requirements and thus have precedence over the Wi-Fi signal. The PRACH is a channel used by the UE for transmitting a preamble. The preamble is primarily used for uplink time synchronization or the like at an initial access or at certain intervals. Because the LTE connection itself is broken if the ENB fails to receive the preamble in time, the preamble should have precedence over the Wi-Fi signal. A sounding reference signal (SRS) is used for the ENB to predict the quality of the uplink channel and does not cause a significant problem in the LTE connection unless it is transmitted during a short time duration. Therefore, the priority may be given to the Wi-Fi signal over SRS.

TABLE 3

| LTE uplink transmission type | Transmission power adjustment |
|---|---|
| PUSCH | Transmission power is first allocated to Wi-Fi transmission in a time duration overlapped with Wi-Fi transmission, and transmission power is normally allocated to PUSCH in a time duration that is not overlapped with Wi-Fi transmission. The sum of PUSCH transmission power and Wi-Fi transmission power should not exceed the maximum transmission power of UE. |
| PUCCH signal (SR, HARQ feedback, CSI, etc.) | Transmission power is first allocated to PUCCH transmission, and the remaining transmission power is allocated to Wi-Fi transmission. The sum of PUCCH transmission power and Wi-Fi transmission power should not exceed the maximum transmission power of UE at any time point. |
| PRACH signal | Transmission power is first allocated to PRACH transmission, and the remaining transmission power is allocated to Wi-Fi transmission. The sum of PRACH transmission power and Wi-Fi transmission power should not exceed the maximum transmission power of UE at any time point. |
| SRS | Transmission power is first allocated to Wi-Fi transmission in a time duration overlapped with Wi-Fi transmission, and transmission power is normally allocated to SRS in a time duration that is not overlapped with Wi-Fi transmission. The sum of SRS transmission power and Wi-Fi transmission power should not exceed the maximum transmission power of UE. |

Figure 9:
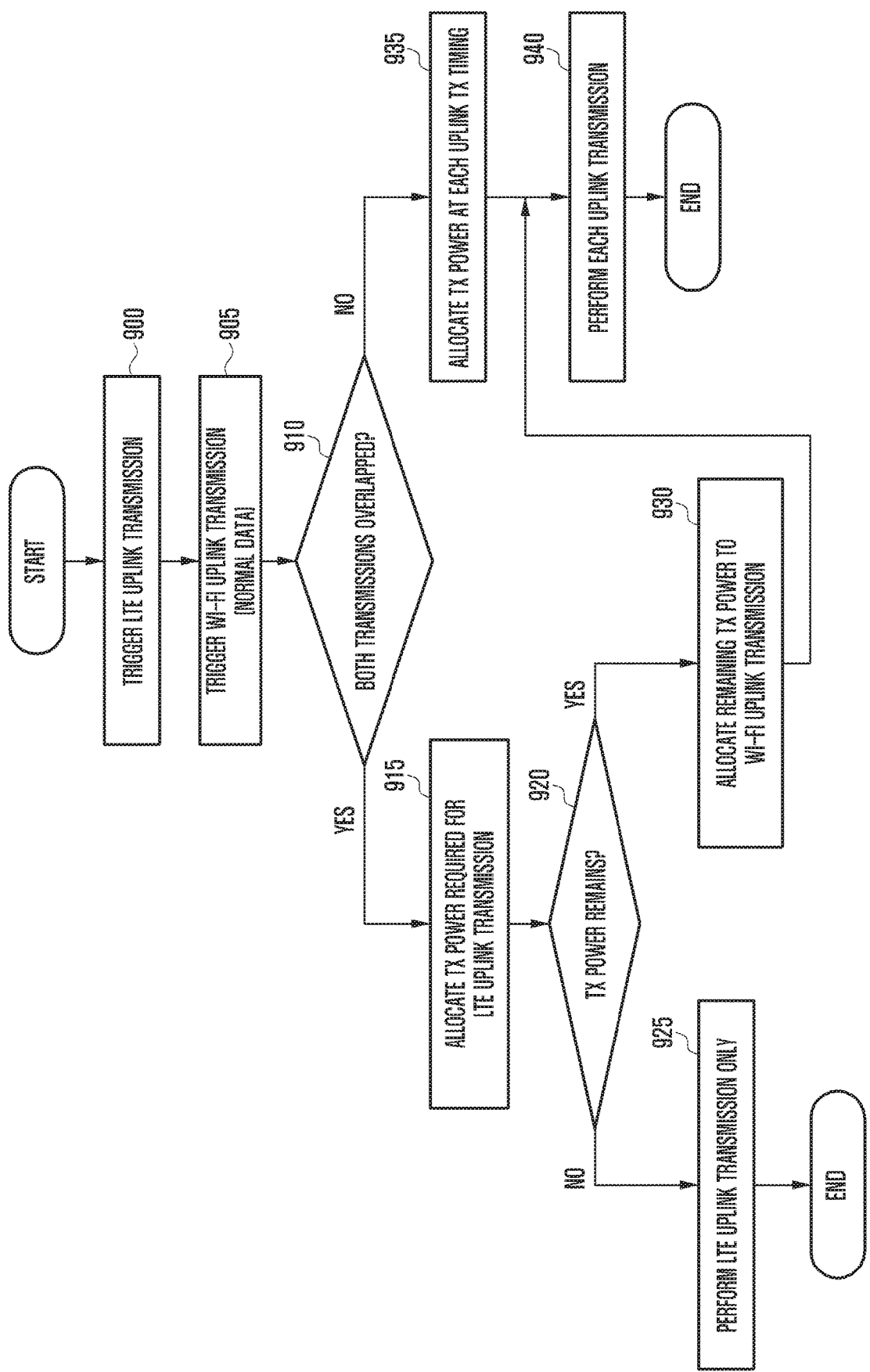
FIG. 9 is a diagram illustrating a terminal operation for giving priority to LTE uplink transmission over Wi-Fi uplink transmission of normal data.

FIG. 9 is a diagram illustrating a terminal operation for giving priority to LTE uplink transmission over Wi-Fi uplink transmission of normal data.

In this embodiment, since the Wi-Fi uplink transmission allows adjustment of transmission time through scheduling, the priority is given to the LTE uplink transmission. At steps 900 and 905, the UE triggers the LTE uplink transmission and the Wi-Fi uplink transmission. In this case, the Wi-Fi uplink transmission is for normal data. At step 910, the UE determines whether the triggered LTE and Wi-Fi uplink transmissions are overlapped with each other in at least part of a time duration. In case of overlap, the UE allocates transmission power required for the LTE uplink transmission at step 915. The required transmission power is determined according to the existing LTE technology, and considerations such as downlink radio path loss and power control information are considered. At step 920, the UE determines whether the UE transmission power remains after the transmission power required for the LTE uplink transmission is allocated. If no UE transmission power remains, the UE performs at step 925 only the LTE uplink transmission in a section where the LTE uplink transmission and the Wi-Fi uplink transmission are overlapped with each other. If there is the remaining UE transmission power, the UE allocates this power to the Wi-Fi uplink transmission at step 930. At step 940, the UE performs the LTE and Wi-Fi uplink transmissions using the transmission power allocated to each uplink transmission in the section where the LTE uplink transmission and the Wi-Fi uplink transmission overlap.

If it is determined at step 910 that the LTE and Wi-Fi uplink transmissions are not overlapped, the UE allocates transmission power required for each uplink transmission at step 935. At step 940, the UE performs transmission using the allocated transmission power in each transmission section.

Figure 10A:
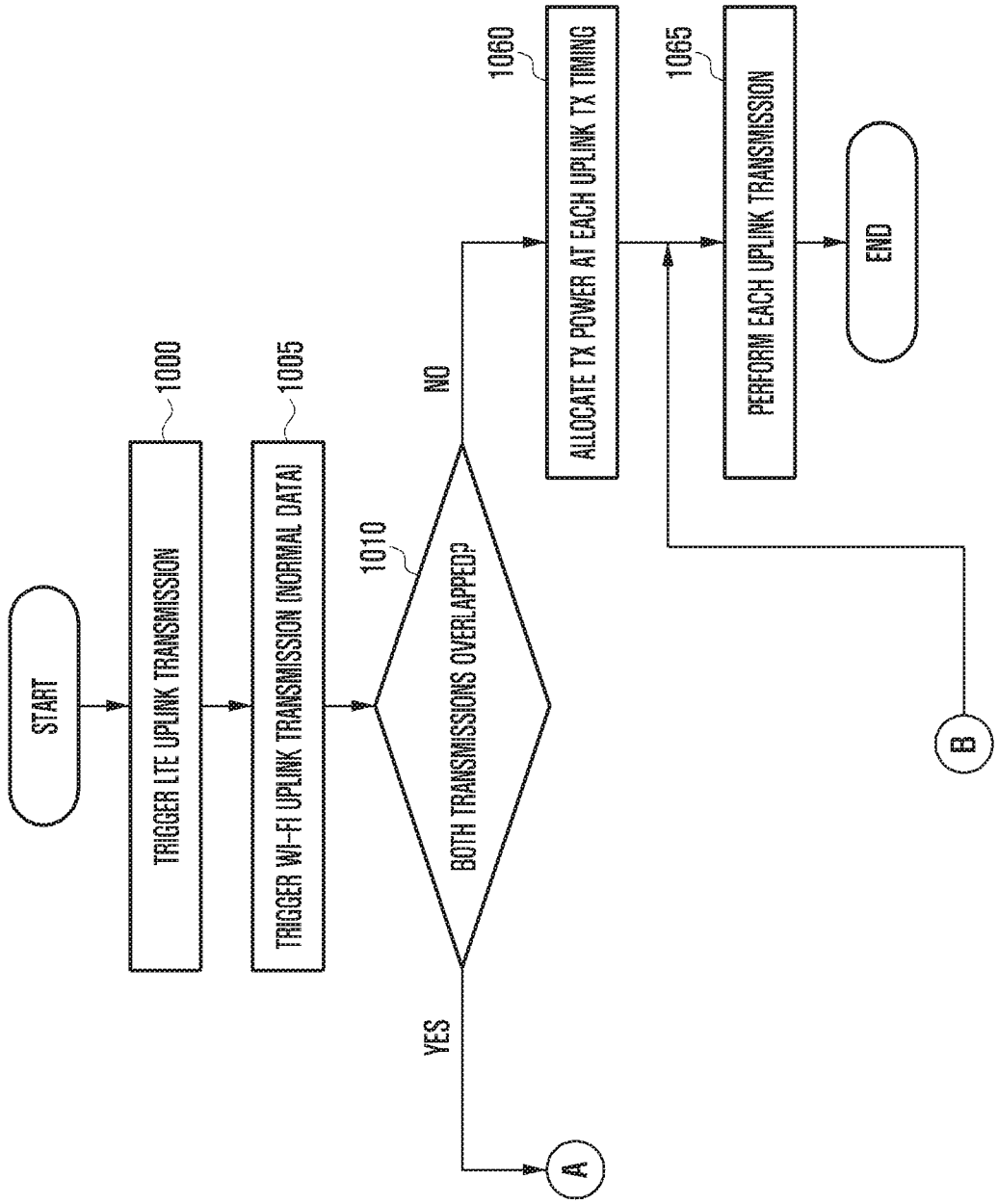
FIGS. 10A and 10B are diagrams illustrating a terminal operation for controlling transmission power when LTE uplink transmission is overlapped with Wi-Fi uplink transmission of control data.
Figure 10B:
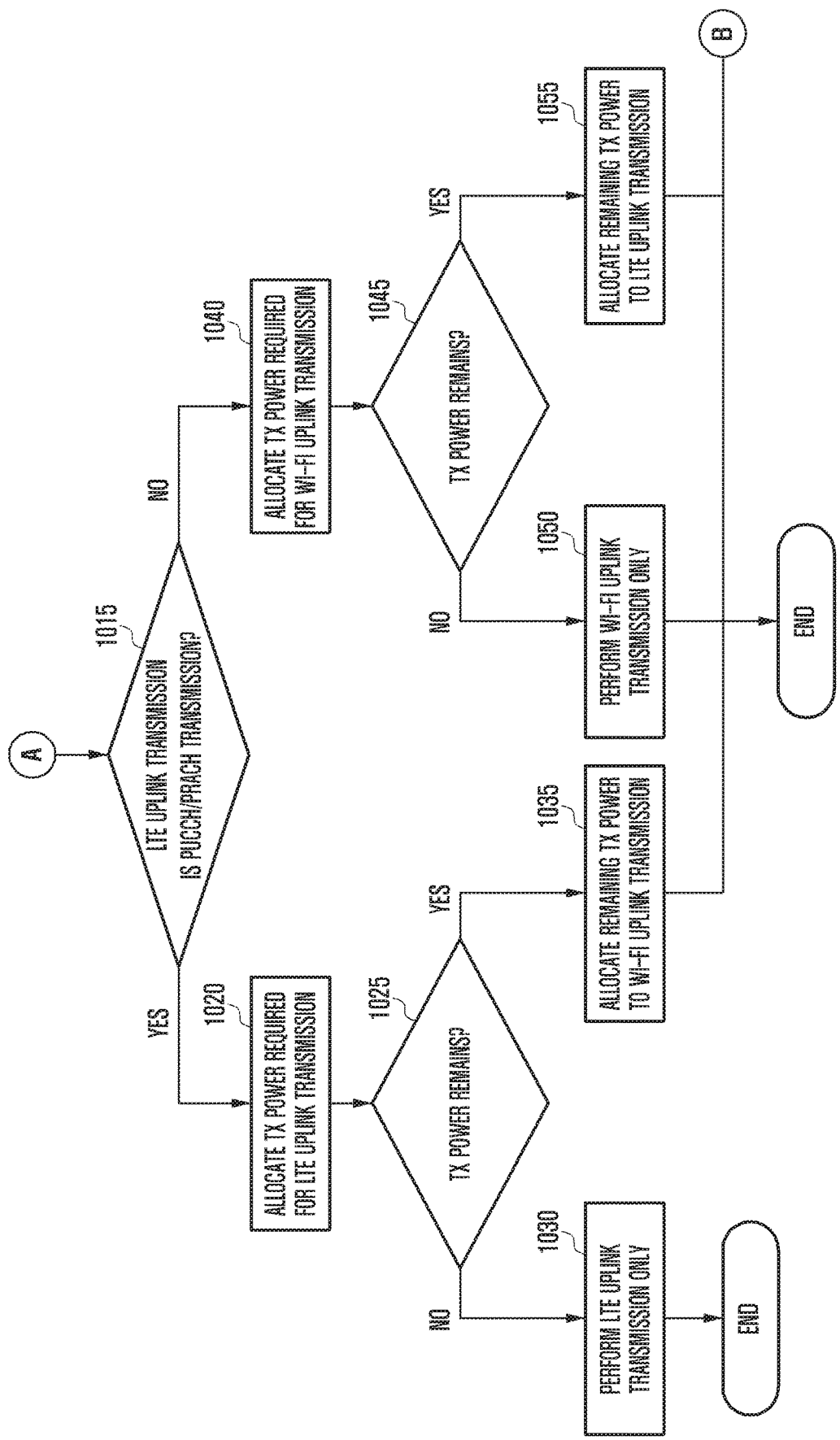

FIGS. 10A and 10B are diagrams illustrating a terminal operation for controlling transmission power when LTE uplink transmission is overlapped with Wi-Fi uplink transmission of control data. Described in this embodiment is a method for controlling transmission power allocation depending on the type of the LTE uplink transmission when the Wi-Fi uplink transmission is for important control signals such as beacon, management, and ACK/NACK for a downlink signal.

At steps 1000 and 1005, the UE triggers the LTE uplink transmission and the Wi-Fi uplink transmission. In this case, the Wi-Fi uplink transmission is for a control signal. The control signal should satisfy predetermined time requirements and may be difficult to adjust the transmission time through scheduling. At step 1010, the UE determines whether the transmission times of the LTE uplink transmission and the Wi-Fi uplink transmission are overlapped with each other. If so, the UE determines at step 1015 whether the LTE uplink transmission is one of PUCCH transmission and PRACH transmission. Information transmitted through a PUCCH channel is a control signal and should satisfy the predetermined time requirements. When the requirements are not satisfied, the UE may be disconnected from the network. In addition, the UE transmits a preamble for random access through a PRACH channel, and the preamble is used for radio resource request and time synchronization in the initial access and is transmitted for performing time synchronization at certain time intervals. If the preamble using the PRACH is not properly transmitted to the ENB, the UE may fail to access the network, or the existing connection may be disconnected. Because the LTE connection is essential to the LTE-Wi-Fi integrated technology, the priority should be given to the LTE uplink transmissions for the LTE connection even if the Wi-Fi uplink transmission is associated with a control signal. Although not mentioned in the present invention, all the LTE uplink transmissions that may have a significant impact upon the LTE access and connection have always higher priorities than the Wi-Fi uplink transmission.

If the LTE uplink transmission is one of the PUCCH transmission and the PRACH transmission, the UE allocates transmission power required for the LTE uplink transmission at step 1020. At step 1025, the UE determines whether the UE transmission power remains after the transmission power required for the LTE uplink transmission is allocated. If no UE transmission power remains, the UE performs only the LTE uplink transmission at step 1030. If there is the remaining UE transmission power, the UE allocates this remaining power to the Wi-Fi uplink transmission at step 1035 and then performs each uplink transmission using the allocated transmission power at step 1065.

If the LTE uplink transmission is normal uplink data transmission or SRS transmission with minor importance at step 1015, the UE preferentially allocates the transmission power required for the Wi-Fi uplink transmission at step 1040. The LTE uplink transmission does not cause a serious problem even if it is not performed for a certain time or the transmission time thereof is adjusted through scheduling. Therefore, it is desirable to allocate the transmission power preferentially to the Wi-Fi control signal that causes serious degradation in Wi-Fi transmission performance if not transmitted in time. At step 1045, the UE determines whether the UE transmission power remains after the transmission power required for the Wi-Fi uplink transmission is allocated. If not, the UE performs only the Wi-Fi uplink transmission at step 1055. If there is the remaining UE transmission power, the UE allocates this remaining power to the LTE uplink transmission at step 1055. At step 1065, the UE performs each uplink transmission using the allocated transmission power.

If it is determined at step 1010 that the LTE uplink transmission and the Wi-Fi uplink transmission are not overlapped, the UE allocates transmission power required for each uplink transmission at step 1060 and then performs transmission using the allocated transmission power in each transmission section at step 1065.

Figure 11:
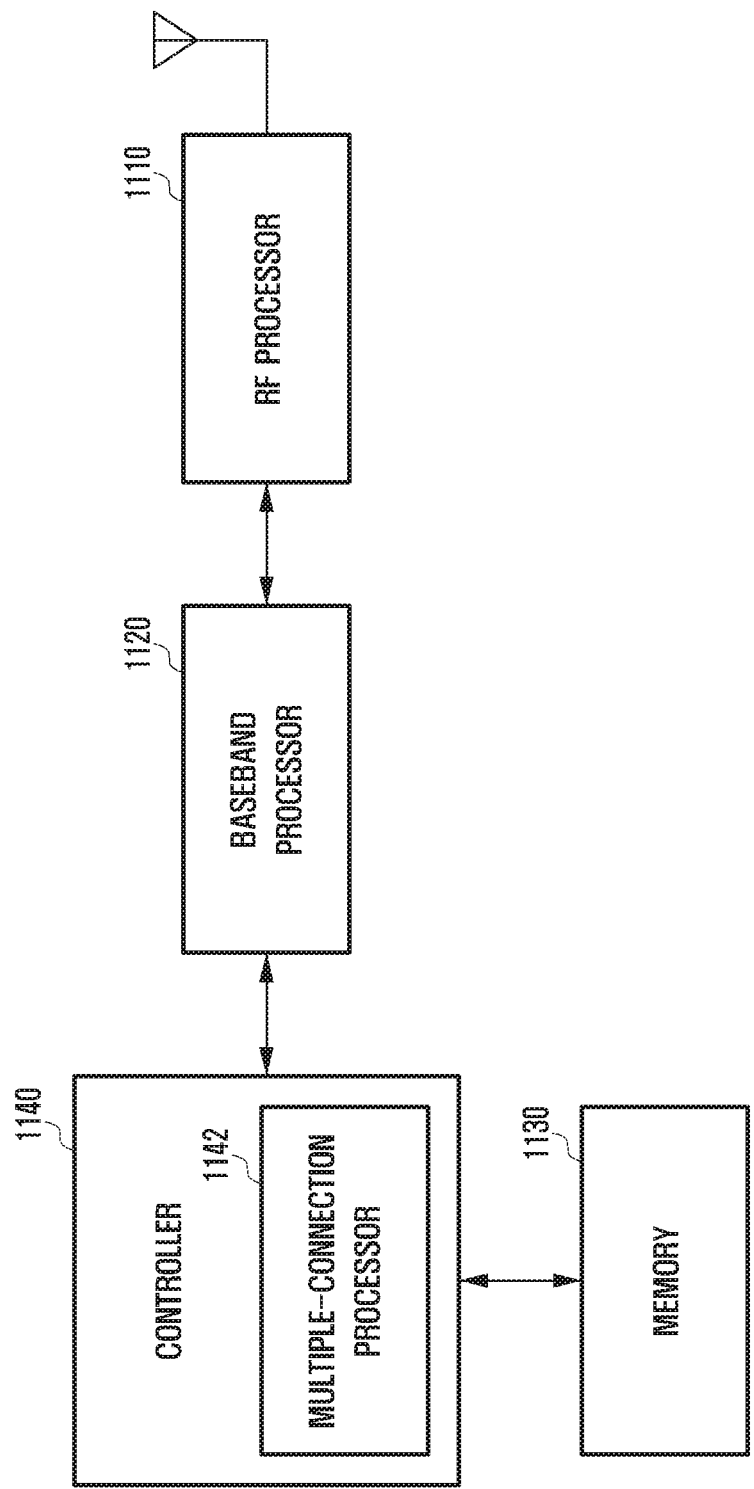
FIG. 11 is a diagram illustrating a block configuration of a terminal in a wireless communication system according to an embodiment of the present invention.

FIG. 11 is a diagram illustrating a block configuration of a terminal in a wireless communication system according to an embodiment of the present invention.

Referring to FIG. 11, the terminal (i.e., UE) includes a radio frequency (RF) processor 1110, a baseband processor 1120, a memory 1130, and a controller 1140.

The RF processor 1110 performs a function of transmitting and receiving a signal through a radio channel, such as band conversion and amplification of the signal. Namely, the RF processor 1110 up-converts a baseband signal, provided from the baseband processor 1120, into an RF band signal, transmits the RF band signal through an antenna, and down-converts an RF band signal, received through the antenna, into a baseband signal. For example, the RF processor 1110 may include a transmission filter, a reception filter, an amplifier, a mixer, an oscillator, a digital to analog converter (DAC), an analog to digital converter (ADC), and the like. Although only one antenna is shown in FIG. 11, the UE may have a plurality of antennas. In addition, the RF processor 1110 may include a plurality of RF chains. Further, the RF processor 1110 may perform beamforming. For the beamforming, the RF processor 1110 may adjust the phase and size of each signal transmitted and received through a plurality of antennas or antenna elements.

The baseband processor 1120 performs a function of conversion between a baseband signal and a bit string according to a physical layer specification of the system. For example, in case of transmitting data, the baseband processor 1120 generates complex symbols by encoding and modulating a transmission bit string. Also, in case of receiving data, the baseband processor 1120 restores a reception bit string by demodulating and decoding a baseband signal provided from the RF processor 1110. For example, in accordance with the OFDM scheme, in case of transmitting data, the baseband processor 1120 generates complex symbols by encoding and modulating a transmission bit string, maps the complex symbols to subcarriers, and constructs OFDM symbols through the inverse fast Fourier transform (IFFT) operation and the cyclic prefix (CP) insertion. Also, in case of receiving data, the baseband processor 1120 divides a baseband signal provided from the RF processor 1110 into units of OFDM symbols, restores signals mapped to subcarriers through the fast Fourier transform (FFT) operation, and restores a reception bit string through demodulation and decoding.

The baseband processor 1120 and the RF processor 1110 transmit and receive signals as described above. Accordingly, the baseband processor 1120 and the RF processor 1110 may be referred to as a transmitter, a receiver, a transceiver, or a communication unit. Further, at least one of the baseband processors 1120 and the RF processor 1110 may include a plurality of communication modules to support a plurality of different radio access technologies. Also, at least one of the baseband processors 1120 and the RF processor 1110 may include different communication modules to process signals of different frequency bands. For example, the different radio access technologies may include a wireless LAN (WLAN), a cellular network, and the like. In addition, the different frequency bands may include a super high frequency (SHF, e.g., 2.5 GHz, 5 GHz) band, and a millimeter wave (mm-wave, e.g., 60 GHz) band.

The memory 1130 stores a basic program for operations of the UE, an application program, and data such as setting information. In particular, the memory 1130 may store information about the second access node that performs wireless communication using the second radio access technology. In this case, the second radio access technology may be a WLAN, and the second access node may be an AP. In addition, the memory 1130 provides the stored data in response to a request of the controller 1140.

The controller 1140 controls overall operations of the UE. For example, the controller 1140 transmits and receives signals through the baseband processor 1120 and the RF processor 1110. Also, the controller 1140 writes or reads data in or from the memory 1140. For this, the controller 1140 may include at least one processor. For example, the controller 1140 may include a communication processor (CP) for controlling communication and an application processor (AP) for controlling an upper layer such as an application program. According to an embodiment of the present invention, the controller 1140 includes a multiple-connection processor 1142 that performs processing required for operating in a multiple connection mode. In addition, the controller 1140 may control the UE to perform operations and procedures of the UE shown in FIGS. 7 to 10. In an embodiment of this invention, the maximum transmission power of the UE may be dynamically adjusted depending on the proximity between the UE and the user. Namely, this is dynamically varied so that the specific absorption rate (SAR) requirements are satisfied.

Figure 12:
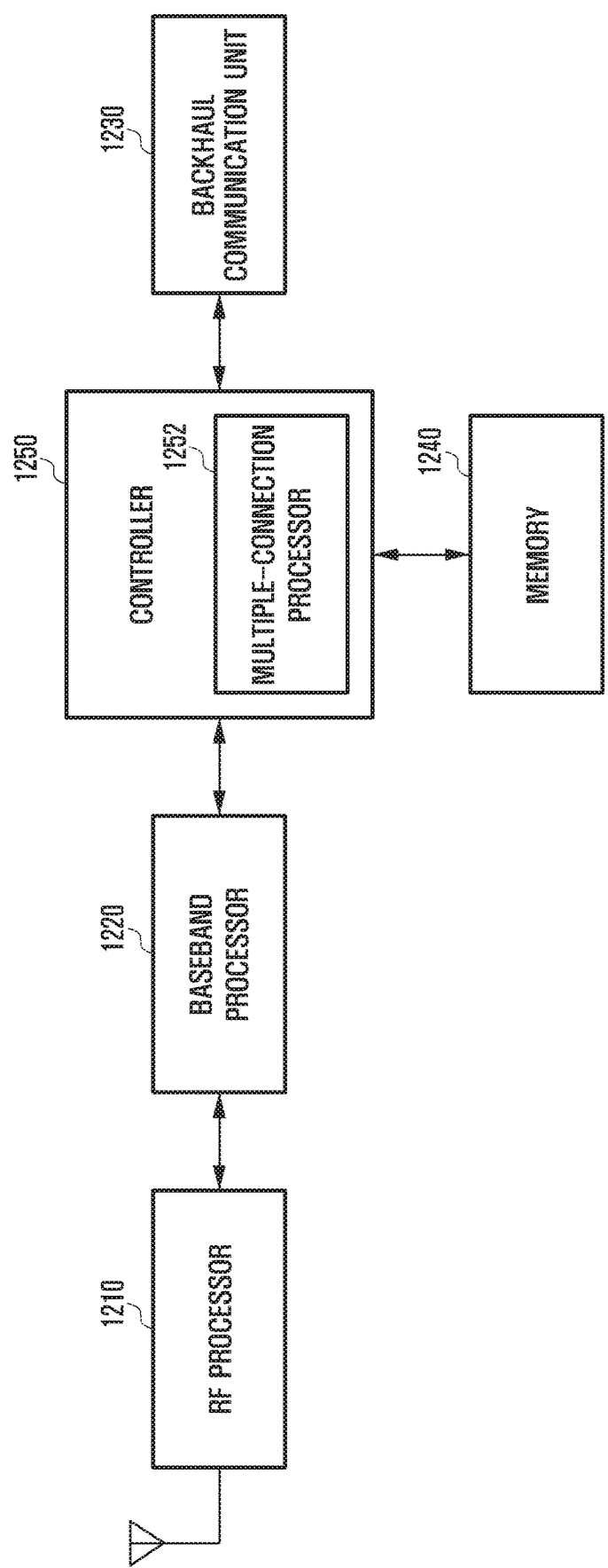
FIG. 12 is a diagram illustrating a block configuration of a first access node in a wireless communication system according to an embodiment of the present invention.

FIG. 12 is a diagram illustrating a block configuration of a first access node in a wireless communication system according to an embodiment of the present invention.

Referring to FIG. 12, the first access node includes an RF processor 1210, a baseband processor 1220, a backhaul communication unit 1230, a memory 1240, and a controller 1250. The first access node may be a cellular base station, especially, an LTE ENB. The first radio access technology may be cellular communication technology, especially, LTE.

The RF processor 1210 performs a function of transmitting and receiving a signal through a radio channel, such as band conversion and amplification of the signal. Namely, the RF processor 1210 up-converts a baseband signal, provided from the baseband processor 1220, into an RF band signal, transmits the RF band signal through an antenna, and down-converts an RF band signal, received through the antenna, into a baseband signal. For example, the RF processor 1210 may include a transmission filter, a reception filter, an amplifier, a mixer, an oscillator, a DAC, an ADC, and the like. Although only one antenna is shown in FIG. 15, the first access node may have a plurality of antennas. In addition, the RF processor 1210 may include a plurality of RF chains. Further, the RF processor 1210 may perform beamforming. For the beamforming, the RF processor 1210 may adjust the phase and size of each signal transmitted and received through a plurality of antennas or antenna elements.

The baseband processor 1220 performs a function of conversion between a baseband signal and a bit string according to a physical layer specification of the first radio access technology. For example, in case of transmitting data, the baseband processor 1220 generates complex symbols by encoding and modulating a transmission bit string. Also, in case of receiving data, the baseband processor 1220 restores a reception bit string by demodulating and decoding a baseband signal provided from the RF processor 1210. For example, in accordance with the OFDM scheme, in case of transmitting data, the baseband processor 1220 generates complex symbols by encoding and modulating a transmission bit string, maps the complex symbols to subcarriers, and constructs OFDM symbols through the IFFT operation and the CP insertion. Also, in case of receiving data, the baseband processor 1220 divides a baseband signal provided from the RF processor 1210 into units of OFDM symbols, restores signals mapped to subcarriers through the FFT operation, and restores a reception bit string through demodulation and decoding. The baseband processor 1220 and the RF processor 1210 transmit and receive signals as described above. Accordingly, the baseband processor 1220 and the RF processor 1210 may be referred to as a transmitter, a receiver, a transceiver, or a communication unit.

The backhaul communication unit 1230 provides an interface for performing communication with other nodes in the network. Namely, the backhaul communication unit 1230 converts a bit string, transmitted from the first access node to another node, for example, another access node (e.g., the second access node), the core network, etc., into a physical signal, and also converts a physical signal received from another node into a bit string.

The memory 1240 stores a basic program for operations of the first access node, an application program, and data such as setting information. In particular, the memory 1240 may store information about bearer allocated to the accessed UE, a measurement result reported by the accessed UE, and the like. Also, the memory 1240 may store information that is a criterion for determining whether to provide or stop the multiple connections to the UE. In addition, the memory 1240 provides the stored data in response to a request of the controller 1250.

The controller 1250 controls overall operations of the first access node. For example, the controller 1250 transmits and receives signals through the baseband processor 1220 and the RF processor 1210 or through the backhaul communication unit 1230. Also, the controller 1250 writes or reads data in or from the memory 1240. For this, the controller 1250 may include at least one processor. According to an embodiment of the present invention, the controller 1250 includes a multiple-connection controller 1252 that performs control for providing the multiple connections to the UE. For example, the controller 1250 may control the first access node to perform operations and procedures of the ENB shown in FIG. 7.

Figure 13:
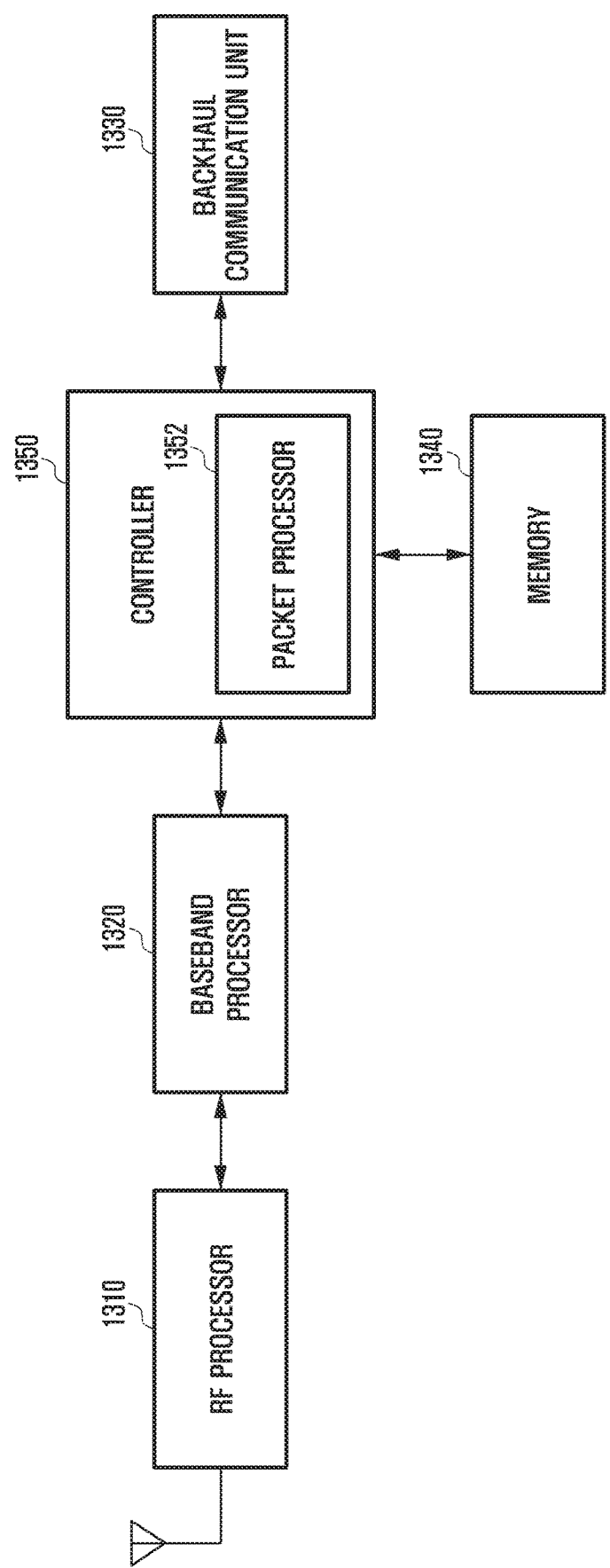
FIG. 13 is a diagram illustrating a block configuration of a second access node in a wireless communication system according to an embodiment of the present invention.

FIG. 13 is a diagram illustrating a block configuration of a second access node in a wireless communication system according to an embodiment of the present invention.

Referring to FIG. 13, the second access node includes an RF processor 1310, a baseband processor 1320, a backhaul communication unit 1330, a memory 1340, and a controller 1350.

The RF processor 1310 performs a function of transmitting and receiving a signal through a radio channel, such as band conversion and amplification of the signal. Namely, the RF processor 1310 up-converts a baseband signal, provided from the baseband processor 1320, into an RF band signal, transmits the RF band signal through an antenna, and down-converts an RF band signal, received through the antenna, into a baseband signal. For example, the RF processor 1310 may include a transmission filter, a reception filter, an amplifier, a mixer, an oscillator, a DAC, an ADC, and the like. Although only one antenna is shown in FIG. 13, the second access node may have a plurality of antennas. In addition, the RF processor 1310 may include a plurality of RF chains. Further, the RF processor 1310 may perform beamforming. For the beamforming, the RF processor 1310 may adjust the phase and size of each signal transmitted and received through a plurality of antennas or antenna elements.

The baseband processor 1320 performs a function of conversion between a baseband signal and a bit string according to a physical layer specification of the second radio access technology. For example, in case of transmitting data, the baseband processor 1320 generates complex symbols by encoding and modulating a transmission bit string. Also, in case of receiving data, the baseband processor 1320 restores a reception bit string by demodulating and decoding a baseband signal provided from the RF processor 1310. For example, in accordance with the OFDM scheme, in case of transmitting data, the baseband processor 1320 generates complex symbols by encoding and modulating a transmission bit string, maps the complex symbols to subcarriers, and constructs OFDM symbols through the IFFT operation and the CP insertion. Also, in case of receiving data, the baseband processor 1320 divides a baseband signal provided from the RF processor 1310 into units of OFDM symbols, restores signals mapped to subcarriers through the FFT operation, and restores a reception bit string through demodulation and decoding. The baseband processor 1320 and the RF processor 1310 transmit and receive signals as described above. Accordingly, the baseband processor 1320 and the RF processor 1310 may be referred to as a transmitter, a receiver, a transceiver, or a communication unit.

The backhaul communication unit 1330 provides an interface for performing communication with other nodes in the network. Namely, the backhaul communication unit 1330 converts a bit string, transmitted from the second access node to another node, for example, another access node (e.g., the first access node), the core network, etc., into a physical signal, and also converts a physical signal received from another node into a bit string.

The memory 1340 stores a basic program for operations of the second access node, an application program, and data such as setting information. In particular, the memory 1340 may store information about bearer allocated to the accessed UE, a measurement result reported by the accessed UE, and the like. Also, the memory 1340 may store information that is a criterion for determining whether to provide or stop the multiple connections to the UE. In addition, the memory 1340 provides the stored data in response to a request of the controller 1350.

The controller 1350 controls overall operations of the second access node. For example, the controller 1350 transmits and receives signals through the baseband processor 1320 and the RF processor 1310 or through the backhaul communication unit 1330. Also, the controller 1350 writes or reads data in or from the memory 1340. For this, the controller 1350 may include at least one processor. According to an embodiment of the present invention, the controller 1350 includes a packet processor 1352 for processing data transmitted or received to or from the UE that operates in the multiple connection mode. The packet processor 1352 may generate and analyze a packet of the second radio access technology including a packet of the first radio access technology as payload. For example, the controller 1350 may control the second access node to operate like the AP shown in FIG. 7.

The invention claimed is:

1. A method for receiving a medium access control (MAC) packet data unit (PDU) in a wireless communication system, the method comprising:
   receiving the MAC PDU transmitted by a base station;
   ignoring a sub-header and a payload portion corresponding to the sub-header and processing other sub-headers and payload portions corresponding to the other sub-headers, in case that the MAC PDU is received through a multicast channel (MCH) and a reserved value is included in the sub-header of the MAC PDU; and
   discarding the MAC PDU in case that the MAC PDU is associated with a unicast and is received through a downlink shared channel (DL-SCH) and the MAC PDU includes a reserved value.

2. The method of claim 1, further comprising:
   ignoring an MAC control element (CE) and a sub-header corresponding to the MAC CE and processing other sub-headers and corresponding payload portions in case that the MAC PDU is received through the MCH and a reserved value is included in the MAC CE of the MAC PDU.

3. The method of claim 1, further comprising:
   ignoring an MAC random access response (RAR) and a sub-header corresponding to the MAC RAR and processing other sub-headers and corresponding payload portions in case that the MAC PDU is associated with the MAC RAR and a reserved value is included in the MAC RAR.

4. The method of claim 1, wherein, in case that the MAC PDU is associated with a random access response (RAR) and a reserved value is included in a backoff parameter field, a value of the backoff parameter field is set to a predetermined specific value.

5. The method of claim 1, wherein identification of whether the reserved value is included in the MAC PDU is performed based on a release of a terminal.

6. A terminal for receiving a medium access control (MAC) packet data unit (PDU) in a wireless communication system, the terminal comprising:
   a transceiver; and
   a controller coupled with the transceiver, and configured to:
   receive the MAC PDU transmitted from a base station,
   ignore a sub-header and a payload portion corresponding to the sub-header and process other sub-headers and payload portions corresponding to the other sub-headers, in case that the MAC PDU is received through a multicast channel (MCH) and a reserved value is included in the sub-header of the MAC PDU, and
   discard the MAC PDU in case that the MAC PDU is associated with a unicast and is received through a downlink shared channel (DL-SCH) and the MAC PDU includes a reserved value.

7. The terminal of claim 6, wherein the controller is further configured to ignore an MAC control element (CE) and a sub-header corresponding to the MAC CE and process other sub-headers and corresponding payload portions in case that the MAC PDU is received through the MCH and a reserved value is included in the MAC CE of the MAC PDU.

8. The terminal of claim 6, wherein the controller is further configured to ignore an MAC random access response (RAR) and a sub-header corresponding to the MAC RAR and process other sub-headers and corresponding payload portions in case that the MAC PDU is associated with the MAC RAR and a reserved value is included in the MAC RAR.

9. The terminal of claim 6, wherein, in case that the MAC PDU is associated with a random access response (RAR) and a reserved value is contained in a backoff parameter field, the controller is further configured to set a value of the backoff parameter field to a predetermined specific value.

10. The terminal of claim 6, wherein the controller is further configured to identify whether the reserved value is included in the MAC PDU based on a release of the terminal.

* * * * *